US012645083B2

(12) United States Patent
Kuzuhara et al.

(10) Patent No.: US 12,645,083 B2
(45) Date of Patent: Jun. 2, 2026

(54) OPTICAL SYSTEM AND IMAGE DISPLAY DEVICE

(71) Applicant: Panasonic Intellectual Property Management Co., Ltd., Osaka (JP)

(72) Inventors: Satoshi Kuzuhara, Osaka (JP); Kazuhiro Minami, Osaka (JP); Hiroaki Okayama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 286 days.

(21) Appl. No.: 18/611,990

(22) Filed: Mar. 21, 2024

(65) Prior Publication Data

US 2024/0231109 A1 Jul. 11, 2024

Related U.S. Application Data

(63) Continuation of application No. PCT/JP2022/017882, filed on Apr. 15, 2022.

(30) Foreign Application Priority Data

Sep. 30, 2021 (JP) ................................. 2021-161777

(51) Int. Cl.
*G02B 27/14* (2006.01)
*G02B 5/02* (2006.01)
(Continued)

(52) U.S. Cl.
CPC .......... *G02B 27/0172* (2013.01); *G02B 5/02* (2013.01); *G02B 5/18* (2013.01); *G02B 5/32* (2013.01);
(Continued)

(58) Field of Classification Search
CPC ... G02B 5/02; G02B 5/18; G02B 5/32; G02B 6/262; G02B 6/34; G02B 27/0172;
(Continued)

(56) References Cited

U.S. PATENT DOCUMENTS 7,206,107 B2 4/2007 Levola
7,418,170 B2 8/2008 Mukawa et al.
(Continued)

FOREIGN PATENT DOCUMENTS

WO 2020/041620 2/2020
WO 2021/040979 3/2021

OTHER PUBLICATIONS

Extended European Search Report issued Dec. 9, 2024 in European Patent Application No. 22875430.5.
(Continued)

*Primary Examiner* — Mahidere S Sahle
(74) *Attorney, Agent, or Firm* — WENDEROTH, LIND & PONACK, L.L.P.

(57) ABSTRACT

The optical system includes a light guide guiding an image light ray including a first light ray with a first wavelength range and a second light ray with a second wavelength range having wavelengths shorter than wavelengths in the first wavelength range, to a field of view region as a virtual image. The light guide includes a first dividing region including first dividing points dividing the incident first light ray and a second dividing region including second dividing points dividing the incident second light ray. The first dividing points include first and second points respectively corresponding to first and second peripheral regions of the field of view region. The second dividing points include third and fourth points respectively corresponding to the first and second peripheral regions. Dividing efficiencies E1 to E4 at the first to fourth points satisfy the following formula (1).
(Continued)

$$\left(\frac{E2}{E1}\right) \div \left(\frac{E4}{E3}\right) \times \left(\frac{E3}{E1}\right)^2 < 0.9 \qquad (1)$$

20 Claims, 18 Drawing Sheets

(51) Int. Cl.

| | |
|---|---|
| *G02B 5/18* | (2006.01) |
| *G02B 5/32* | (2006.01) |
| *G02B 6/26* | (2006.01) |
| *G02B 6/34* | (2006.01) |
| *G02B 27/00* | (2006.01) |
| *G02B 27/01* | (2006.01) |
| *G02B 27/02* | (2006.01) |
| *G03H 1/02* | (2006.01) |

(52) U.S. Cl.
CPC ............... *G02B 6/262* (2013.01); *G02B 6/34* (2013.01); *G02B 27/0081* (2013.01); *G02B 27/02* (2013.01); *G03H 1/02* (2013.01); *G02B 2027/0112* (2013.01); *G02B 2027/0118* (2013.01); *G02B 2027/0123* (2013.01); *G02B 2027/0125* (2013.01)

(58) Field of Classification Search
CPC ............... G02B 27/0081; G02B 27/02; G02B 2027/0112; G02B 2027/0118; G02B 2027/0123; G02B 2027/0125; G03H 1/02
USPC .............. 359/1–35, 563, 566–576, 630–633; 345/7–9; 385/31–38
See application file for complete search history.

(56) References Cited

U.S. PATENT DOCUMENTS

| | | |
|---|---|---|
| 7,573,640 B2 | 8/2009 | Nivon |
| 2006/0126179 A1 | 6/2006 | Levola |

OTHER PUBLICATIONS

International Search Report issued Jun. 14, 2022 in International (PCT) Application No. PCT/JP2022/017882.
English language translation of International Preliminary Report on Patentability issued Apr. 2, 2024 in corresponding International (PCT) Patent Application No. PCT/JP2022/017882.

Number of times of Dividing

Number of times of Dividing

OPTICAL SYSTEM AND IMAGE DISPLAY DEVICE

CROSS-REFERENCE TO RELATED APPLICATIONS

The present application is a continuation of PCT/JP2022/017882 filed Apr. 15, 2022, which claims priority to Japanese Patent Application No. 2021-161777, filed on Sep. 30, 2021, the entire contents of which are incorporated herein by reference.

TECHNICAL FIELD

The present disclosure relates to optical systems and image display devices

BACKGROUND ART

Patent document 1 discloses an exit pupil extender. The exit pupil extender disclosed in patent document 1 uses a substrate including three layers of optical material. Each of first to third layers has an input diffraction grating and an output diffraction grating. In patent document 1, in order to achieve an exit beam in which the relative amount of color components is more consistent with that of the color components in the incoming beam, the grating period on the diffraction gratings on each of the first to third layer is chosen differently. A grating period of the first layer is determined based on a wavelength of a red component. A grating period of the second layer is determined based on a wavelength of a green component. A grating period of the third layer is determined based on a wavelength of a blue component.

PRIOR ART DOCUMENTS

Patent Documents

Patent Document 1: U.S. Pat. No. 7,206,107 B2

SUMMARY OF THE INVENTION

Problems to be Solved by the Invention

In patent document 1, the incoming beam has red, green, and blue components. A light ray with a shorter wavelength can be absorbed more easily inside the optical member. This tendency becomes more apparent as a refractive index of an optical member becomes larger. In patent document 1, as the blue component propagates inside the optical member, the blue component is more absorbed inside the optical member than the red and green components are. This may result in difference in color between parts of the output diffraction grating closer to and further from the input diffraction grating.

The present disclosure provides optical systems and image display devices enable improvement of color uniformity.

Solutions to the Problems

An aspect of the present disclosure is an optical system including: a light guide for guiding an image light ray which is output from a display element and forms an image, to a field of view region of a user as a virtual image. The image light ray includes a first light ray with a first wavelength range and a second light ray with a second wavelength range having wavelengths shorter than wavelengths in the first wavelength range. The light guide includes a first in-coupling region, a first dividing region, a second in-coupling region, and a second dividing region. The first in-coupling region allows the first light ray to enter the light guide so that the first light ray propagates within the light guide. The first dividing region includes a plurality of first dividing points which divide the first light ray entering the light guide from the first in-coupling region and allows a plurality of first exit light rays to emerge toward the field of view region. The second in-coupling region allows the second light ray to enter the light guide so that the second light ray propagates within the light guide. The second dividing region includes a plurality of second dividing points which divide the second light ray entering the light guide from the second in-coupling region and allows a plurality of second exit light rays to emerge toward the field of view region. The field of view region includes a first peripheral region on a side of a first end in a predetermined direction within a plane of the field of view region and a second peripheral region on a side of a second end in the predetermined direction. The plurality of first dividing points include a first point and a second point which are arranged in a first propagation direction corresponding to the predetermined direction to divide the first light ray propagating in the first propagation direction. The first point corresponds to a point within the first peripheral region, and the second point is further from the first in-coupling region than the first point is, and corresponds to a point within the second peripheral region. The plurality of second dividing points include a third point and a fourth point which are arranged in a second propagation direction corresponding to the predetermined direction to divide the second light ray propagating in the second propagation direction. The third point corresponds to a point within the first peripheral region, and the fourth point is further from the second in-coupling region than the third point is, and corresponds to a point within the second peripheral region. When a dividing efficiency for the first light ray at the first point is denoted by E1, a dividing efficiency for the first light ray at the second point is denoted by E2, a dividing efficiency for the second light ray at the third point is denoted by E3, and a dividing efficiency for the second light ray at the fourth point is denoted by E4, the dividing efficiencies E1, E2, E3, and E4 satisfy the following formula (1).

[FORMULA 1]

$$\left(\frac{E2}{E1}\right) \div \left(\frac{E4}{E3}\right) \times \left(\frac{E3}{E1}\right)^2 < 0.9 \tag{1}$$

An aspect of the present disclosure includes the aforementioned optical system and a display element.

Effects of the Invention

Aspects of the present disclosure enables improvement of color uniformity.

DETAILED DESCRIPTION

Hereinafter, embodiments will be described in detail with reference to appropriate drawings. Note that, description more detailed than necessary will be omitted. For example, detailed description of well-known matters or duplicate description of substantially the same components may be omitted. This aims to avoid the following description from becoming more redundant than necessary and to facilitate understanding of persons skilled in the art. The inventor(s) provides the following description and attached drawings for making persons skilled in the art understand the present disclosure only and has no intention to limit subject matters claimed in claims.

A positional relationship such as an upward, downward, left, or right direction is assumed to be based on a positional relationship illustrated in Figures, unless otherwise noted. Figures referred to in the following embodiments are schematic figures. There is no guarantee that size or thickness ratios of individual components in each Figure always reflect actual dimensional ratios thereof. The dimensional ratios of the individual components are not limited to those illustrated in Figures.

In the present disclosure, expressions "travel in_direction" and "propagate in_direction" used in relation to light rays mean that a light ray forming an image travels in the_direction as a whole and therefore light beams included in the light ray forming the image may be permitted to be inclined relative to the_direction. For example, regarding a "light ray traveling in_direction", it is sufficient that a main light beam of this light is directed in the_direction, and auxiliary beams of this light may be inclined relative to the_direction.

1. EMBODIMENTS

1.1 Embodiment 1

1.1.1 Configurations

Figure 1:
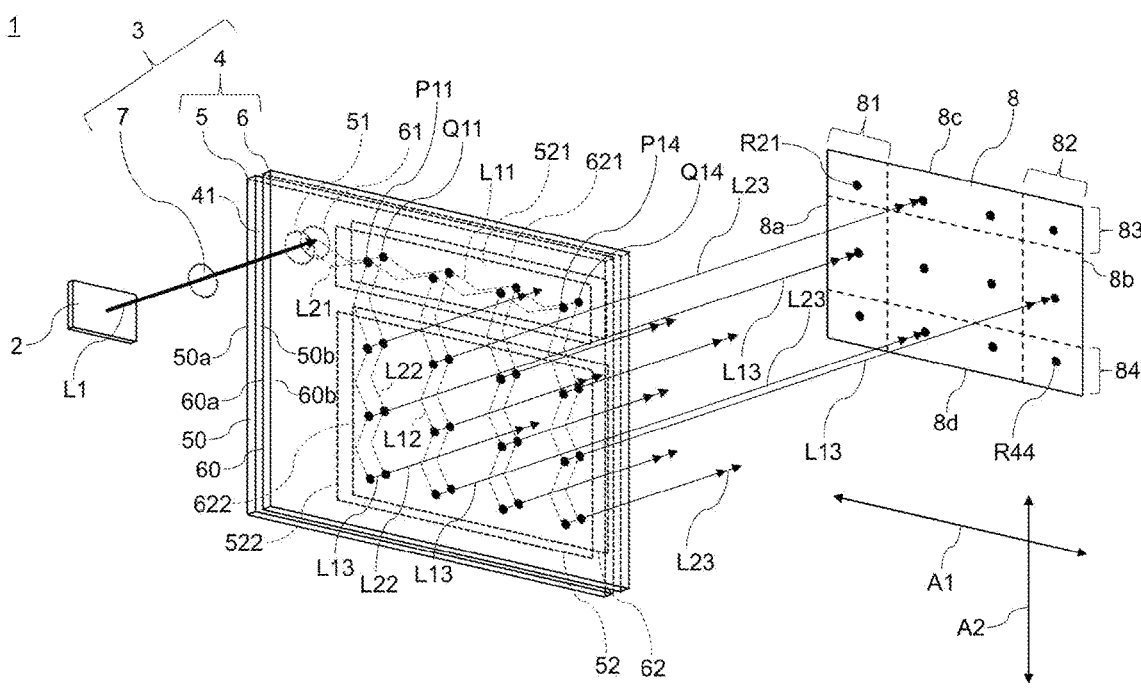
FIG. 1 is a schematic perspective view of an image display device of embodiment 1.

FIG. 1 is a schematic view of a configuration example of an image display device 1. The image display device 1 is, for example, a head mounted display (HMD) which is mounted on a user's head and displays an image (picture). As shown in FIG. 1, the image display device 1 includes a display element 2 and an optical system 3.

The display element 2 is configured to output an image light ray L1 forming an image (picture). Herein, only for simplifying FIG. 1, the image light ray L1 is depicted as light with directivity. However, actually, the image light ray L1 is incident on the optical system 3 as light having an angle corresponding to a field of view. The image light ray L1 includes light beams output from respective points of the display element 2. In the present embodiment, the image light ray L1 includes a first light ray L11 with a first wavelength range and a second light ray L21 with a second wavelength range having wavelengths shorter than wavelengths in the first wavelength range. This means that an upper limit of the second wavelength range is lower than a lower limit of the first wavelength range. The first wavelength range is, for example, between 510 nm and 780 nm, inclusive. The first light ray L11 includes red light and green light, for example. The first light ray L11 has a peak in a range of 495 nm to 570 nm and another peak in a range of 620 nm to 750 nm, for example. The first light ray L11 may be red light or green light. The second wavelength range is, for example, between 380 nm and 480 nm, inclusive. The second light ray L21 is blue light. The second light ray L21 has a peak in a range of 450 nm to 495 nm, for example. The respective points of the display element 2 correspond to respective pixels (red, green, and blue pixels) of the display element 2, for example. An optical axis of the display element 2 is an optical axis of the image light ray L1. The optical axis of the image light ray L1 is an optical axis of a light ray output from a center of the display element 2, for example. Examples of the display element 2 may include known displays such as liquid crystal displays, organic EL displays, scanning MEMS mirrors, or the like.

The optical system 3 is configured to guide the image light ray L1 output from the display element 2 to a field of view region 8 set relative to eyes of the user. Within the field of view region 8, the user can watch by his or her own eyes the image formed by the display element 2 with the image not being interrupted. Especially, in the present embodiment, the optical system 3 expands the field of view region 8 by utilizing effects of pupil expansion. In other words, the optical system 3 expands the field of view region 8 by reproducing an eye of the image light ray L1.

Figure 2:
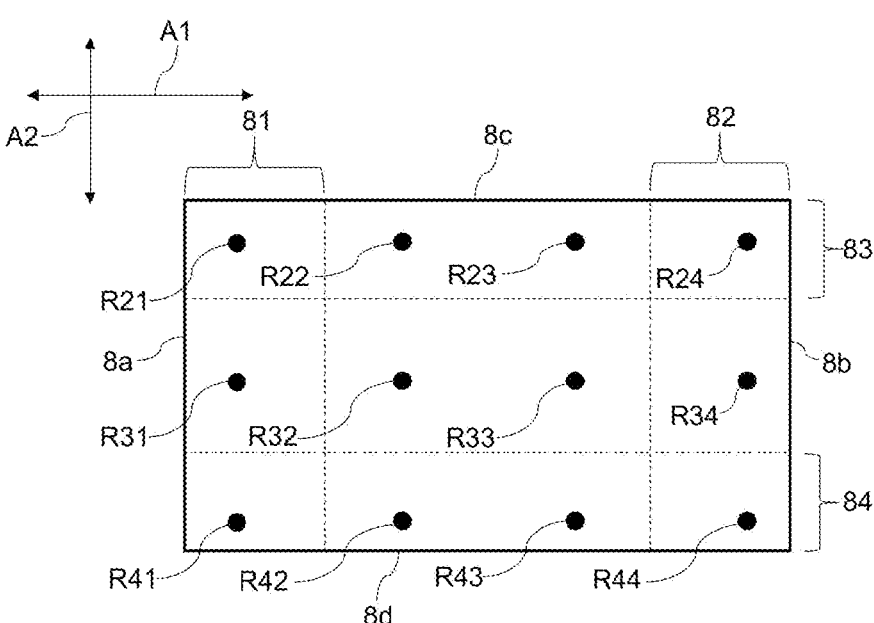
FIG. 2 is an explanatory view of a field of view region.

FIG. 2 is an explanatory view of the field of view region 8. The field of view region 8 is defined by a rectangular plane. The field of view region 8 includes a plurality of points R21 to R24, R31 to R34, R41 to R44 (hereinafter, collectively designated by reference sign R). The plurality of points R correspond to positions of pupils of the image light ray L1 reproduced by the optical system 3. The field of view region 8 includes a first peripheral region 81 on a side of a first end 8a in a predetermined direction A1 within the plane of the field of view region 8, and a second peripheral region 82 on a side of a second end 8b in the predetermined direction A1. Further, the field of view region 8 includes a third peripheral region 83 on a side of a third end 8c in a second predetermined direction A2 intersecting a first predetermined direction being the predetermined direction A1 within the plane of the field of view region 8, and a fourth peripheral region 84 on a side of a fourth end 8d in the second predetermined direction A2. For example, the first predetermined direction A1 corresponds to a horizontal direction and the second predetermined direction A2 corresponds to a vertical direction. The first peripheral region 81 is a rectangular region extending from the first end 8a toward a center, of the field of view region 8.

A dimension in the first predetermined direction A1 of the first peripheral region 81 is 25% of a dimension in the first predetermined direction A1 of the field of view region 8. A dimension in the second predetermined direction A2 of the first peripheral region 81 is equal to a dimension in the second predetermined direction A2 of the field of view region 8. Accordingly, the first peripheral region 81 occupies a quarter of the field of view region 8 from the first end 8a of the field of view region 8 in the first predetermined direction A1.

The second peripheral region 82 is a rectangular region extending from the second end 8b toward the center, of the field of view region 8. A dimension in the first predetermined direction A1 of the second peripheral region 82 is 25% of the dimension in the first predetermined direction A1 of the field of view region 8. A dimension in the second predetermined direction A2 of the second peripheral region 82 is equal to the dimension in the second predetermined direction A2 of the field of view region 8. Accordingly, the second peripheral region 82 occupies a quarter of the field of view region 8 from the second end 8b of the field of view region 8 in the first predetermined direction A1.

The third peripheral region 83 is a rectangular region extending from the third end 8c toward the center, of the field of view region 8. A dimension in the second predetermined direction A2 of the third peripheral region 83 is 25% of the dimension in the second predetermined direction A2 of the field of view region 8. A dimension in the first predetermined direction A1 of the third peripheral region 83 is equal to the dimension in the first predetermined direction A1 of the field of view region 8. Accordingly, the third peripheral region 83 occupies a quarter of the field of view region 8 from the third end 8c of the field of view region 8 in the second predetermined direction A2.

The fourth peripheral region 84 is a rectangular region extending from the fourth end 8d toward the center, of the field of view region 8. A dimension in the second predetermined direction A2 of the fourth peripheral region 84 is 25% of the dimension in the second predetermined direction A2 of the field of view region 8. A dimension in the first predetermined direction A1 of the fourth peripheral region 84 is equal to the dimension in the first predetermined direction A1 of the field of view region 8. Accordingly, the fourth peripheral region 84 occupies a quarter of the field of view region 8 from the fourth end 8d of the field of view region 8 in the second predetermined direction A2.

As shown in FIG. 1, the optical system 3 includes a light guide 4 and a projection optical system 7.

The light guide 4 is configured to guide the image light ray L1 which is output from the display element 2 and forms the image, toward the field of view region 8 of the user as a virtual image. The light guide 4 of FIG. 1 includes a first substrate 5 and a second substrate 6. The first substrate 5 and the second substrate 6 constitute the light guide 4. Therefore, in some cases, a state where light rays propagate within the first substrate 5 or within the second substrate 6 may be expressed as a state where light rays propagate within the light guide 4.

Figure 3:
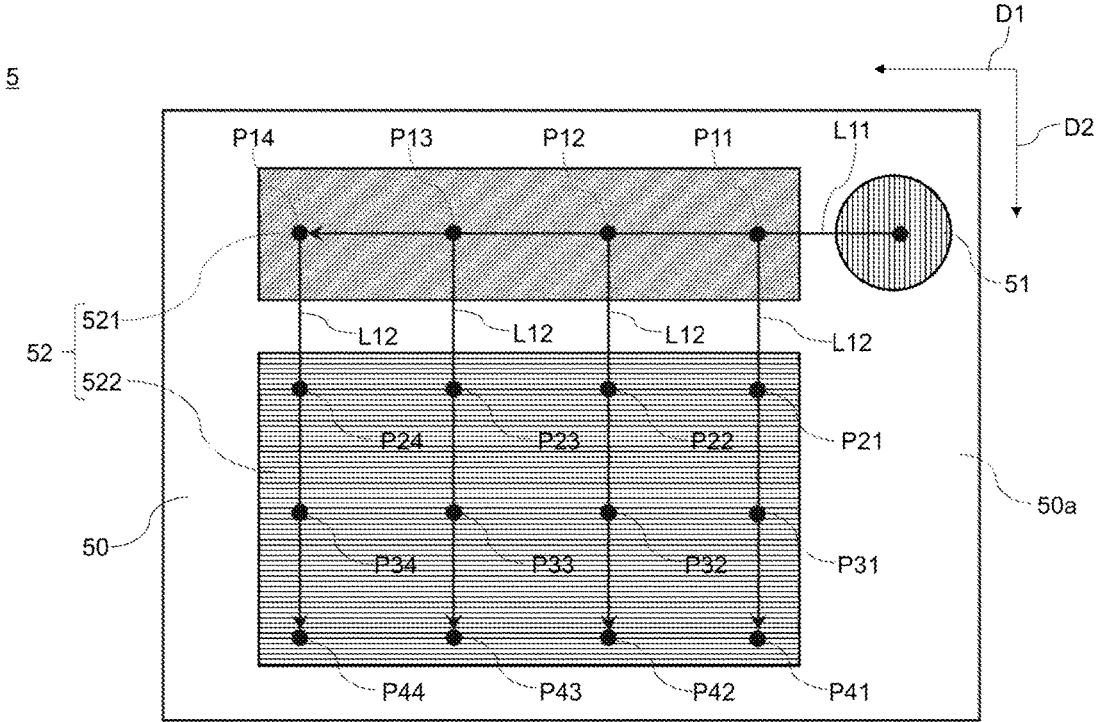
FIG. 3 is a front view of a first substrate of a light guide of the image display device of FIG. 1.

FIG. 3 is a front view of the first substrate 5 when viewed from the display element 2. The first substrate 5 includes a body 50, a first in-coupling region 51, and a first dividing region 52.

The body 50 is made of material transparent for a visible light region and includes a first surface 50a and a second surface 50b in a thickness direction thereof. A refractive index for d-line (wavelength of 587.562 nm) of the body 50 is larger than 1.7. An internal absorptance for the first light ray L11 of the body 50 is substantially zero. In the present embodiment, the body 50 has a rectangular plate shape. As shown in FIG. 1, the body 50 is positioned or arranged to direct the first surface 50a toward the display element 2 and direct the second surface 50b toward the field of view region 8 (the second substrate 6).

The first in-coupling region 51 is configured to allow the first light ray L11 to be incident on the light guide 4 and propagate within the light guide 4. In the present embodiment, the first in-coupling region 51 allows the first light ray L11 to be incident on the first substrate 5 and propagate within the first substrate 5 (within the body 50) of the light guide 4 in a first direction D1 (the left direction in FIG. 3) perpendicular to the thickness direction of the first substrate 5 (the thickness direction of the body 50). In the present embodiment, the image light ray L1 includes the first light ray L11 and the second light ray L21. The first in-coupling region 51 is configured to work for the first light ray L11 rather than the second light ray L21, and thus allows the first light ray L11 of the image light ray L1 to enter the first substrate 5 and allows the second light ray L21 of the image light ray L1 to pass therethrough. Note that, part of the second light ray L21 may enter the first substrate 5 inevitably. The first in-coupling region 51 is used for coupling between the display element 2 and the light guide 4. The first in-coupling region 51 allows the first light ray L11 of the image light ray L1 to be incident on the first substrate 5 and propagate within the first substrate 5 under a total reflection condition. The term "coupling" used herein means allowing propagation within the light guide 4 under a total reflection condition. In the present embodiment, the first direction D1 corresponds to the first predetermined direction of the field of view region 8.

The first in-coupling region 51 is constituted by a periodic structure causing diffraction effect for the first light ray L11. The periodic structure of the first in-coupling region 51 is, for example, a transmission diffraction grating. The first in-coupling region 51 is formed in or on the first surface 50a of the body 50, for example. A diffraction grating of the first in-coupling region 51 may include a plurality of recessed or protruded parts which extend in a second direction D2 (the downward direction in FIG. 3) perpendicular to the thickness direction of the body 50 of the first substrate 5 and intersecting the first direction D1 and are arranged at a predetermined interval in the first direction D1, for example. In the present embodiment, the second direction D2 is perpendicular to the first direction D1, too. The first in-coupling region 51 uses diffraction to allow the first light ray L11 to be incident on the body 50 to meet a condition where it is totally reflected by the first surface 50*a* and the second surface 50*b*. The first in-coupling region 51 allows the first light ray L11 to travel in the first direction D1 within the first substrate 5 (within the body 50) while being totally reflected by the first surface 50*a* and the second surface 50*b*.

A size of the first in-coupling region 51 is set to allow part or a whole of the first light ray L11 of the image light ray L1 from the display element 2 through the projection optical system 7 to be incident on the first in-coupling region 51. In the present embodiment, as shown in FIG. 3, the first in-coupling region 51 has a circular shape.

The first dividing region 52 reproduces a pupil of the first light ray L11 to expand the pupil by: dividing the first light ray L11 entering the light guide 4 from the first in-coupling region 51 into a plurality of first exit light rays L13 to be allowed to emerge toward the field of view region 8. In the present embodiment, the plurality of first exit light rays L13 are parallel to each other. The expression "the plurality of first exit light rays L13 are parallel to each other" is not limited to meaning that the plurality of first exit light rays L13 are parallel to each other in strict sense but may include meaning where the plurality of first exit light rays L13 are parallel to each other approximately. The plurality of first exit light rays L13 may not be parallel to each other in strict sense, but it is sufficient that directions of the plurality of first exit light rays L13 coincide so that the plurality of first exit light rays L13 are considered to be parallel to each other in view of optical design. When the plurality of first exit light rays L13 are parallel to each other, it is possible to improve uniformity of arrangement of pupils of the image light ray L1 in the field of view region 8. This can reduce an area of the field of view region 8 where no pupil of the image light ray L1 is located.

The first dividing region 52 of FIG. 3 includes a plurality of first dividing points P11 to P14, P21 to P24, P31 to P34, P41 to P44 (hereinafter, collectively designated by reference sign P) and allows the plurality of first exit light rays L13 parallel to each other to emerge toward the field of view region 8. The number of first dividing points P corresponds to the number of times of dividing the first light ray L11. A distance between the first dividing points P depends on the refractive index of the first substrate 5. The distance between the first dividing points P becomes smaller with an increase in the refractive index of the first substrate 5. Therefore, by increasing the refractive index of the first substrate 5, the distance between the first dividing points P can be made smaller, and it is possible to reduce an area of the field of view region 8 where no pupil of the image light ray L1 is located.

The first dividing region 52 of FIG. 3 includes a first extension region 521 and a first exit region 522.

The first extension region 521 and the first in-coupling region 51 are arranged side by side in the first direction D1. The first extension region 521 divides the first light ray L11 propagating within the light guide 4 into a plurality of first light rays L12 arranged in the first direction D1 and allows the plurality of first light rays L12 to travel toward the first exit region 522. In the present embodiment, the first extension region 521 includes the first dividing points P11 to P14 of the plurality of first dividing points P11 to P14, P21 to P24, P31 to P34, P41 to P44. The first dividing points P11 to P14 are arranged in the first direction D1. The first extension region 521 allows the first light ray L11 from the first in-coupling region 51 to travel in the first direction D1, and allows part of the first light ray L11 to travel toward the second direction D2 as a first light ray L12 at each of the first dividing points P11 to P14. By doing so, the first extension region 521 extends the pupil of the first light ray L11 in the first direction D1. In summary, as shown in FIG. 3, the first extension region 521 reproduces in the first direction D1 the pupil of the first light ray L11 of the image light ray L1 projected by the projection optical system 7 to expand the pupil by dividing the first light ray L11 into the plurality of first light rays L12 which are parallel to each other and travel toward the first exit region 522.

The first extension region 521 is constituted by a periodic structure causing diffraction effect for the first light ray L11. The periodic structure of the first extension region 521 is, for example, a reflection diffraction grating. The first extension region 521 is formed in or on the first surface 50*a* of the body 50, for example. A diffraction grating of the first extension region 521 may include a plurality of recessed or protruded parts which extend in a direction inclined at 45 degrees relative to the first direction D1 within the plane perpendicular to the thickness direction of the body 50 and are arranged at a predetermined interval in a direction inclined at 135 degrees relative to the first direction D1, for example.

A size of the first extension region 521 is set to allow a whole of the first light ray L11 from the first in-coupling region 51 to enter the first extension region 521. In the present embodiment, as shown in FIG. 3, the first extension region 521 has a quadrilateral shape. A length in the first direction D1 of the first extension region 521 is equal to or longer than 100 mm, for example.

The first exit region 522 and the first extension region 521 are arranged side by side in the second direction D2. The first exit region 522 divides the plurality of first light rays L12 from the first extension region 521 into a plurality of first light rays arranged in the second direction D2 and allows the plurality of first light rays arranged in the second direction D2 to emerge toward the field of view region 8 as the plurality of first exit light rays L13. In the present embodiment, the first exit region 522 includes the first dividing points P21 to P24, P31 to P34, P41 to P44 of the plurality of first dividing points P11 to P14, P21 to P24, P31 to P34, P41 to P44. The first dividing points P21, P31, P41 are arranged in the second direction D2. The first dividing points P22, P32, P42 are arranged in the second direction D2. The first dividing points P23, P33, P43 are arranged in the second direction D2.

The first exit region 522 allows the first light ray L12 from the first dividing point P11 of the first extension region 521 to propagate in the second direction D2, and allows part of the first light ray L12 to emerge from the light guide 4 toward the field of view region 8 at each of the first dividing points P21, P31, P41 as the first exit light ray L13. The first exit region 522 allows the first light ray L12 from the first dividing point P12 of the first extension region 521 to propagate in the second direction D2, and allows part of the first light ray L12 to emerge from the light guide 4 toward the field of view region 8 at each of the first dividing points P22, P32, P42 as the first exit light ray L13. The first exit region 522 allows the first light ray L12 from the first dividing point P13 of the first extension region 521 to propagate in the second direction D2, and allows part of the first light ray L12 to emerge from the light guide 4 toward the field of view region 8 at each of the first dividing points P23, P33, P43 as the first exit light ray L13.

As described above, the first exit region 522 expands the pupil of the first light ray L11 in the second direction D2. In summary, as shown in FIG. 1, the first exit region 522 reproduces the pupil of the first light ray L11 projected by the projection optical system 7 to expand the pupil by dividing the first light ray L11 into the plurality of first exit light rays L13 which are parallel to each other and travel from the light guide 4 toward the field of view region 8. Light rays divided at the first dividing points P21 to P24, P31 to P34, P41 to P44 of the first exit region 522 arrive at the plurality of points R21 to R24, R31 to R34, R41 to R44 of the field of view region 8, respectively. Therefore, the first dividing points P21 to P24, P31 to P34, P41 to P44 correspond to the plurality of points R21 to R24, R31 to R34, R41 to R44 of the field of view region 8, respectively.

The first exit region 522 is constituted by a periodic structure causing diffraction effect for the first light ray L11. The periodic structure of the first exit region 522 is, for example, a reflection diffraction grating. The first exit region 522 is formed in or on the first surface 50*a* of the body 50, for example. A diffraction grating of the first exit region 522 may include a plurality of recessed or protruded parts which extend in the first direction D1 and are arranged at a predetermined interval in the second direction D2, for example.

A size of the first exit region 522 is set to allow all of the first light rays L12 from the first extension region 521 to enter the first exit region 522. In the present embodiment, as shown in FIG. 3, the first exit region 522 has a quadrilateral shape. A length in the first direction D1 of the first exit region 522 is equal to or longer than 100 mm, for example. A length in the second direction D2 of the first exit region 522 is equal to or longer than 100 mm, for example.

Figure 4:
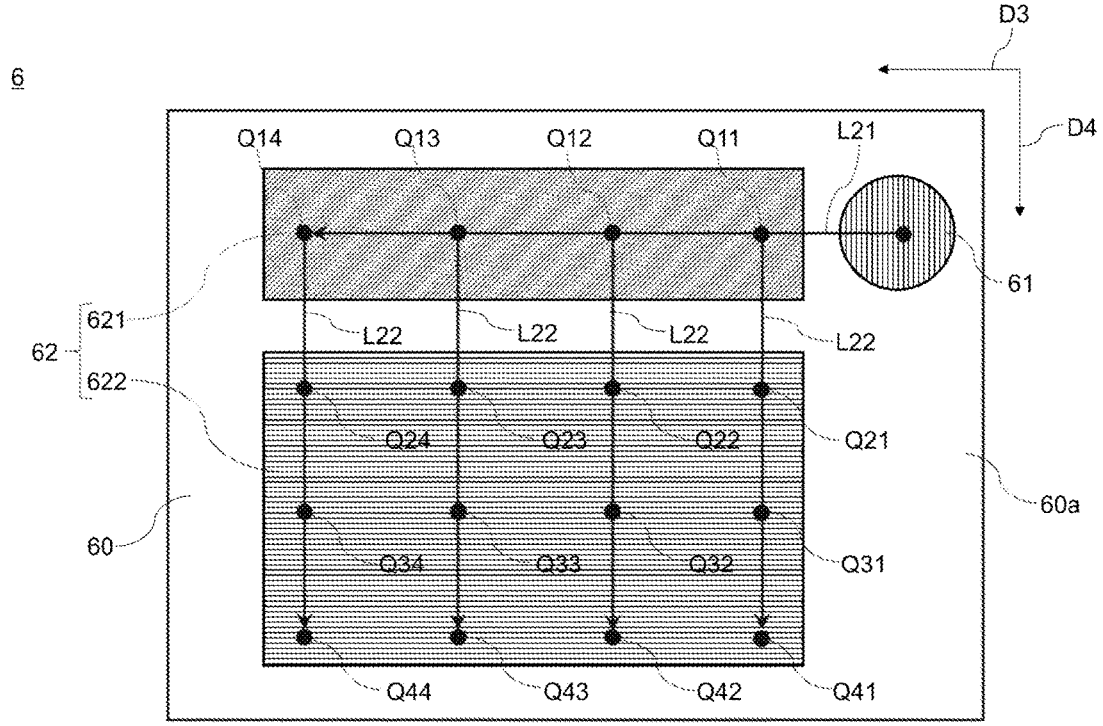
FIG. 4 is a front view of a second substrate of the light guide of the image display device of FIG. 1.

FIG. 4 is a front view of the second substrate 6 when viewed from the display element 2. The second substrate 6 includes a body 60, a second in-coupling region 61, and a second dividing region 62.

The body 60 is made of material transparent for a visible light region and includes a first surface 60*a* and a second surface 60*b* in a thickness direction thereof. A refractive index for d-line (wavelength of 587.562 nm) of the body 60 is larger than 1.7. An internal absorptance for the second light ray L21 of the body 60 is larger than 0.05%/mm but smaller than 0.50%/mm. In the present embodiment, the body 60 has a rectangular plate shape. As shown in FIG. 1, the body 60 is positioned or arranged to direct the first surface 60*a* toward the display element 2 (toward the first substrate 5) and direct the second surface 60*b* toward the field of view region 8.

The second in-coupling region 61 is configured to allow the second light ray L21 to be incident on the light guide 4 and propagate within the light guide 4. In the present embodiment, the second in-coupling region 61 allows the second light ray L21 to be incident on the second substrate 6 and propagate within the second substrate 6 (within the body 60) of the light guide 4 in a third direction D3 (the left direction in FIG. 4) perpendicular to the thickness direction of the second substrate 6 (the thickness direction of the body 60). The second in-coupling region 61 is used for coupling between the display element 2 and the light guide 4. The second in-coupling region 61 allows the second light ray L21 of the image light ray L1 to be incident on the second substrate 6 and propagate within the second substrate 6 under a total reflection condition. In the present embodiment, the third direction D3 corresponds to the first predetermined direction A1 of the field of view region 8. Accordingly, the third direction D3 of the second substrate 6 corresponds to the first direction D1 of the first substrate 5.

The second in-coupling region 61 is constituted by a periodic structure causing diffraction effect for the second light ray L21. The periodic structure of the second in-coupling region 61 is, for example, a transmission diffraction grating. The second in-coupling region 61 is formed in or on the first surface 60*a* of the body 60, for example. A diffraction grating of the second in-coupling region 61 may include a plurality of recessed or protruded parts which extend in a fourth direction D4 (the downward direction in FIG. 4) perpendicular to the thickness direction of the body 60 of the second substrate 6 and intersecting the third direction D3 and are arranged at a predetermined interval in the third direction D3, for example. In the present embodiment, the fourth direction D4 is perpendicular to the third direction D3, too. In the present embodiment, the fourth direction D4 corresponds to the second predetermined direction A2 of the field of view region 8. Accordingly, the fourth direction D4 of the second substrate 6 corresponds to the second direction D2 of the first substrate 5. The second in-coupling region 61 uses diffraction to allow the second image light ray L21 to be incident on the body 60 to meet a condition where it is totally reflected by the first surface 60*a* and the second surface 60*b*. The second in-coupling region 61 allows the second image light ray L21 to travel in the third direction D3 within the second substrate 6 (within the body 60) while being totally reflected by the first surface 60*a* and the second surface 60*b*.

A size of the second in-coupling region 61 is set to allow part or a whole of the second light ray L21 of the image light ray L1 from the display element 2 through the projection optical system 7 to be incident on the second in-coupling region 61. In the present embodiment, as shown in FIG. 4, the second in-coupling region 61 has a circular shape.

The second dividing region 62 reproduces a pupil of the second light ray L21 to expand the pupil by: dividing the second light ray L21 entering the light guide 4 from the second in-coupling region 61 into a plurality of second exit light rays L23 to be allowed to emerge toward the field of view region 8. In the present embodiment, the plurality of second exit light rays L23 are parallel to each other. The expression "the plurality of second exit light rays L23 are parallel to each other" is not limited to meaning that the plurality of second exit light rays L23 are parallel to each other in strict sense but may include meaning where the plurality of second exit light rays L23 are parallel to each other approximately. The plurality of second exit light rays L23 may not be parallel to each other in strict sense, but it is sufficient that directions of the plurality of second exit light rays L23 coincide so that the plurality of second exit light rays L23 are considered to be parallel to each other in view of optical design. When the plurality of second exit light rays L23 are parallel to each other, it is possible to improve uniformity of arrangement of pupils of the image light ray L1 in the field of view region 8. This can reduce an area of the field of view region 8 where no pupil of the image light ray L1 is located.

The second dividing region 62 of FIG. 4 includes a plurality of second dividing points Q11 to Q14, Q21 to Q24, Q31 to Q34, Q41 to Q44 (hereinafter, collectively designated by reference sign Q) and allows the plurality of second exit light rays L23 parallel to each other to emerge toward the field of view region 8. The number of second dividing points Q corresponds to the number of times of dividing the second light ray L21. A distance between the second dividing points Q depends on the refractive index of the second substrate 6. The distance between the second dividing points Q becomes smaller with an increase in the refractive index of the second substrate 6. Therefore, by increasing the refractive index of the second substrate 6, the distance between the second dividing points Q can be made smaller, and it is possible to reduce an area of the field of view region 8 where no pupil of the image light ray L1 is located.

The second dividing region 62 of FIG. 4 includes a second extension region 621 and a second exit region 622.

The second extension region 621 and the second in-coupling region 61 are arranged side by side in the third direction D3. The second extension region 621 divides the second light ray L21 propagating within the light guide 4 into a plurality of second light rays L22 arranged in the third direction D3 and allows the plurality of second light rays L22 to travel toward the second exit region 622. In the present embodiment, the second extension region 621 includes the second dividing points Q11 to Q14 of the plurality of second dividing points Q11 to Q14, Q21 to Q24, Q31 to Q34, Q41 to Q44.

The second dividing points Q11 to Q14 are arranged in the third direction D3. The second extension region 621 allows the second light ray L21 from the second in-coupling region 61 to travel in the third direction D3, and allows part of the second light ray L21 to travel toward the fourth direction D4 as a second light ray L22 at each of the second dividing points Q11 to Q14. By doing so, the second extension region 621 extends the pupil of the second light ray L21 in the third direction D3. In summary, as shown in FIG. 4, the second extension region 621 reproduces in the third direction D3 the pupil of the second light ray L21 of the image light ray L1 projected by the projection optical system 7 to expand the pupil by dividing the second light ray L21 into the plurality of second light rays L22 which are parallel to each other and travel toward the second exit region 622.

The second extension region 621 is constituted by a periodic structure causing diffraction effect for the second light ray L21. The periodic structure of the second extension region 621 is, for example, a reflection diffraction grating. The second extension region 621 is formed in or on the second surface 60*a* of the body 60, for example. A diffraction grating of the second extension region 621 may include a plurality of recessed or protruded parts which extend in a direction inclined at 45 degrees relative to the third direction D3 within the plane perpendicular to the thickness direction of the body 60 and are arranged at a predetermined interval in a direction inclined at 135 degrees relative to the third direction D3, for example.

A size of the second extension region 621 is set to allow a whole of the second light ray L21 from the second in-coupling region 61 to enter the second extension region 621. In the present embodiment, as shown in FIG. 4, the second extension region 621 has a quadrilateral shape. A length in the third direction D3 of the second extension region 621 is equal to or longer than 100 mm, for example.

The second exit region 622 and the second extension region 621 are arranged side by side in the fourth direction D4. The second exit region 622 divides the plurality of second light rays L22 from the second extension region 621 into a plurality of second light rays arranged in the fourth direction D4 and allows the plurality of second light rays arranged in the fourth direction D4 to emerge toward the field of view region 8 as the plurality of second exit light rays L23. In the present embodiment, the second exit region 622 includes the second dividing points Q21 to Q24, Q31 to Q34, Q41 to Q44 of the plurality of second dividing points Q11 to Q14, Q21 to Q24, Q31 to Q34, Q41 to Q44. The second dividing points Q21, Q31, Q41 are arranged in the fourth direction D4. The second dividing points Q22, Q32, Q42 are arranged in the fourth direction D4. The second dividing points Q23, Q33, Q43 are arranged in the fourth direction D4.

The second exit region 622 allows the second light ray L22 from the second dividing point Q11 of the second extension region 621 to propagate in the fourth direction D4, and allows part of the second light ray L22 to emerge from the light guide 4 toward the field of view region 8 at each of the second dividing points Q21, Q31, Q41 as the second exit light ray L23. The second exit region 622 allows the second light ray L22 from the second dividing point Q12 of the second extension region 621 to propagate in the fourth direction D4, and allows part of the second light ray L22 to emerge from the light guide 4 toward the field of view region 8 at each of the second dividing points Q22, Q32, Q42 as the second exit light ray L23. The second exit region 622 allows the second light ray L22 from the second dividing point Q13 of the second extension region 621 to propagate in the fourth direction D4, and allows part of the second light ray L22 to emerge from the light guide 4 toward the field of view region 8 at each of the second dividing points Q23, Q33, Q43 as the second exit light ray L23.

As described above, the second exit region 622 expands the pupil of the second light ray L21 in the fourth direction D4. In summary, as shown in FIG. 1, the second exit region 622 reproduces the pupil of the second light ray L21 projected by the projection optical system 7 to expand the pupil by dividing the second light ray L21 into the plurality of second exit light rays L23 which are parallel to each other and travel from the light guide 4 toward the field of view region 8. Light rays divided at the second dividing points Q21 to Q24, Q31 to Q34, Q41 to Q44 of the second exit region 622 arrive at the plurality of points R21 to R24, R31 to R34, R41 to R44 of the field of view region 8, respectively. Therefore, the second dividing points Q21 to Q24, Q31 to Q34, Q41 to Q44 correspond to the plurality of points R21 to R24, R31 to R34, R41 to R44 of the field of view region 8, respectively. The plurality of second dividing points Q11 to Q14, Q21 to Q24, Q31 to Q34, Q41 to Q44 and the plurality of first dividing points P11 to P14, P21 to P24, P31 to P34, P41 to P44 correspond to same points R21 to R24, R31 to R34, R41 to R44 of the field of view region 8.

The second exit region 622 is constituted by a periodic structure causing diffraction effect for the second light ray L21. The periodic structure of the second exit region 622 is, for example, a reflection diffraction grating. The second exit region 622 is formed in or on the second surface 60*a* of the body 60, for example. A diffraction grating of the second exit region 622 may include a plurality of recessed or protruded parts which extend in the third direction D3 and are arranged at a predetermined interval in the fourth direction D4, for example.

A size of the second exit region 622 is set to allow all of the second light rays L22 from the second extension region 621 to enter the second exit region 622. In the present embodiment, as shown in FIG. 4, the second exit region 622 has a quadrilateral shape. A length in the third direction D3 of the second exit region 622 is equal to or longer than 100 mm, for example. A length in the fourth direction D4 of the second exit region 622 is equal to or longer than 100 mm, for example.

In the light guide 4 of FIG. 1, the first substrate 5 and the second substrate 6 face each other with an air layer 41 in-between. The first substrate 5 and the second substrate 6 are positioned so that the thickness direction of the body 50 of the first substrate 5 and the thickness direction of the body 60 of the second substrate 6 coincide and the second surface 50*b* of the body 50 and the first surface 60*a* of the body 60 face each other with the air layer 41 in-between. A direction coinciding with the thickness direction of the body 50 of the first substrate 5 and the thickness direction of the body 60 of the second substrate 6 is the thickness direction of the light guide 4. When viewed in the thickness direction of the light guide 4, the first in-coupling region 51 and the first dividing region 52 (the first extension region 521 and the first exit region 522) of the first substrate 5 overlap with the second in-coupling region 61 and the second dividing region 62 (the second extension region 621 and the second exit region 622) of the second substrate 6, respectively.

The image light ray L1 from the display element 2 is incident on the first in-coupling region 51 of the first substrate 5 of the light guide 4. The first in-coupling region 51 allows the first light ray L11 of the image light ray L1 to travel toward the first dividing region 52. In the first dividing region 52, the first extension region 521 divides the first light ray L11 from the first in-coupling region 51 into the plurality of first light rays L12 at the plurality of first dividing points P11 to P14 and allows the plurality of first light rays L12 to travel toward the first exit region 522. The first exit region 522 divides the plurality of first light rays L12 at the plurality of first dividing points P21 to P24, P31 to P34, P41 to P44 to allow the plurality of first exit light rays L13 to emerge toward the field of view region 8. The image light ray L1 passing through the first in-coupling region 51 is incident on the second in-coupling region 61 of the second substrate 6. The second in-coupling region 61 allows the second light ray L21 of the image light ray L1 to travel toward the second dividing region 62. In the second dividing region 62, the second extension region 621 divides the second light ray L21 from the second in-coupling region 61 into the plurality of second light rays L22 at the plurality of second dividing points Q11 to Q14 and allows the plurality of second light rays L22 to travel toward the second exit region 622. The second exit region 622 divides the plurality of second light rays L22 at the plurality of second dividing points Q21 to Q24, Q31 to Q34, Q41 to Q44 to allow the plurality of second exit light rays L23 to emerge toward the field of view region 8.

In the light guide 4, the first exit light rays L13 from the first dividing points P21 to P24, P31 to P34, P41 to P44 of the first exit region 522 arrive at the plurality of points R21 to R24, R31 to R34, R41 to R44 of the field of view region 8, respectively. The second exit light rays L23 from the second dividing points Q21 to Q24, Q31 to Q34, Q41 to Q44 of the second exit region 622 arrive at the plurality of points R21 to R24, R31 to R34, R41 to R44 of the field of view region 8, respectively. Accordingly, at the plurality of points R21 to R24, R31 to R34, R41 to R44 of the field of view region 8, virtual images constituted by the first exit light rays L13 and the second exit light rays L23 are formed.

In the light guide 4, the first dividing point P11 (first point) and the second dividing point Q11 (third point) correspond to same points R21, R31, R41 within the first peripheral region 81 of the field of view region 8. The first dividing point P14 (second point) and the second dividing point Q14 (fourth point) correspond to same points R24, R34, R44 within the second peripheral region 82 of the field of view region 8. The first dividing point P21 (fifth point) and the second dividing point Q21 (seventh point) correspond to a same point R21 within the third peripheral region 83 of the field of view region 8. The first dividing point P41 (sixth point) and the second dividing point Q41 (eighth point) correspond to a same point R41 within the fourth peripheral region 84 of the field of view region 8. The first dividing point P22 (fifth point) and the second dividing point Q22 (seventh point) correspond to a same point R22 within the third peripheral region 83 of the field of view region 8. The first dividing point P42 (sixth point) and the second dividing point Q42 (eighth point) correspond to a same point R42 within the fourth peripheral region 84 of the field of view region 8. The first dividing points P23 (fifth point) and the second dividing point Q23 (seventh point) correspond to a same point R23 within the third peripheral region 83 of the field of view region 8. The first dividing point P43 (sixth point) and the second dividing point Q43 (eighth point) correspond to a same point R43 within the fourth peripheral region 84 of the field of view region 8. The first dividing point P24 (fifth point) and the second dividing point Q24 (seventh point) correspond to a same point R24 within the third peripheral region 83 of the field of view region 8. The first dividing point P44 (sixth point) and the second dividing point Q44 (eighth point) correspond to a same point R44 within the fourth peripheral region 84 of the field of view region 8.

As ratios of light amount of the first exit light ray L13 to light amount of the second exit light ray L23 at the plurality of points R21 to R24, R31 to R34, R41 to R44 of the field of view region 8 are closer to the same, the color uniformity becomes higher. In contrary, as the ratios of light amount of the first exit light ray L13 to light amount of the second exit light ray L23 at the plurality of points R21 to R24, R31 to R34, R41 to R44 of the field of view region 8 are different from each other, the color uniformity becomes lower. In summary, as ratios of the first light ray L11 to the second light ray L21 of the image light ray L1 at respective points in the field of view region 8 are different from each other, the color uniformity becomes lower. A degree of the color uniformity can be evaluated by use of standard deviations about the ratios of the first light ray L11 to the second light ray L21 of the image light ray L1 at respective points in the field of view region 8. In the present embodiment, wavelengths in the second wavelength range of the second light ray L21 from which the second exit light rays L23 originate are shorter than wavelengths in the first wavelength range of the first light ray L11 from which the first exit light rays L13 originate. Light with a shorter wavelength is more easily absorbed within the light guide 4. This tendency becomes more apparent as the refractive index of material of the light guide 4 becomes higher. Therefore, a light amount of the second exit light ray L23 tends to become lower at the second dividing point further from the second in-coupling region 61. As a result, at a point corresponding to the second dividing point apart from the second in-coupling region 61, a color tone may be strongly affected by the first exit light rays L13.

In the present embodiment, in view of the color uniformity, in the light guide 4, the first dividing region 52 is configured to have different dividing efficiencies depending on locations of the first dividing points P, and the second dividing region 62 is configured to have different dividing efficiencies depending on locations of the second dividing points Q. The dividing efficiency at the first dividing point P is defined by a proportion of light amount of a light ray extracted at the first dividing point P to light amount of the first light ray incident on the first dividing point P. The dividing efficiency at the second dividing point Q is defined by a proportion of light amount of a light ray extracted at the second dividing point Q to light amount of the second light ray incident on the second dividing point Q. In the first dividing region 52, the dividing efficiency at the first dividing point P is determined depending on a shape of the periodic structure in a region corresponding to the first dividing point P. Factors determining the shape of the periodic structure may include an aspect ratio, a height, an inclination, or the like, of the diffraction grating. The shape of the periodic structure may be set to have desired dividing efficiencies at the respective dividing points P. This similarly applies to the dividing efficiencies at the second dividing points Q of the second dividing region 62.

In view of this, the color uniformity regarding the first predetermined direction A1 of the field of view region 8 was evaluated with variations in the dividing efficiencies at the first dividing points P of the first extension region 521 and the dividing efficiencies at the second dividing points Q of the second extension region 621. From the result, it was confirmed that variation in the color uniformity regarding the first predetermined direction A1 of the field of view region 8 could be reduced when the first extension region 521 and the second extension region 621 satisfied the following formula (2). Therefore, in the present embodiment, the first extension region 521 and the second extension region 621 are configured to satisfy the following formula (2).

[FORMULA 2]

$$\left(\frac{E2}{E1}\right) \div \left(\frac{E4}{E3}\right) \times \left(\frac{E3}{E1}\right)^2 < 0.9 \tag{2}$$

The dividing efficiency E1 is a dividing efficiency for the first light ray L11 at a first point. The dividing efficiency E2 is a dividing efficiency for the first light ray L11 at a second point. The first point and the second point are selected from the first dividing points P11 to P14 which are included in the plurality of first dividing points P and arranged in a first propagation direction corresponding to the first predetermined direction A1 to divide the first light ray L11 propagating in the first propagation direction. The first propagation direction coincides with the first direction D1. The first point corresponds to the first peripheral region 81, and the second point is further from the first in-coupling region 51 than the first point is, and corresponds to the second peripheral region 82. In the present embodiment, the first dividing point P11 corresponds to the first point and the first dividing point P14 corresponds to the second point.

The dividing efficiency E3 is a dividing efficiency for the second light ray L21 at a third point. The dividing efficiency E4 is a dividing efficiency for the second light ray L21 at a fourth point. The third point and the fourth point are selected from the second dividing points Q11 to Q14 which are included in the plurality of second dividing points Q and arranged in a second propagation direction corresponding to the first predetermined direction A1 to divide the second light ray L21 propagating in the second propagation direction. The second propagation direction coincides with the third direction D3. The third point corresponds to the first peripheral region 81, and the fourth point is further from the second in-coupling region 61 than the third point is, and corresponds to the second peripheral region 82. In the present embodiment, the second dividing point Q11 corresponds to the third point and the second dividing point Q14 corresponds to the fourth point.

Satisfying the above formula (2) enables reducing variation in the color uniformity regarding the first predetermined direction A1 of the field of view region 8. Additionally, when the dividing efficiency E2 is larger than the dividing efficiency E1 and the dividing efficiency E4 is larger than the dividing efficiency E3, variation in luminance regarding the first predetermined direction A1 of the field of view region 8 can be reduced.

The color uniformity regarding the second predetermined direction A2 of the field of view region 8 was evaluated with variations in the dividing efficiencies at the first dividing points P of the first extension region 521 and the dividing efficiencies at the second dividing points Q of the second extension region 621. From the result, it was confirmed that variation in the color uniformity regarding the second predetermined direction A2 of the field of view region 8 could be reduced when the first extension region 521 and the second extension region 621 satisfied the following formula (3). Therefore, in the present embodiment, the first extension region 521 and the second extension region 621 are configured to satisfy the following formula (3).

[FORMULA 3]

$$\left(\frac{E6}{E5}\right) \div \left(\frac{E8}{E7}\right) \times \left(\frac{E7}{E5}\right)^2 < 0.9 \tag{3}$$

The dividing efficiency E5 is a dividing efficiency for the first light ray L11 at a fifth point. The dividing efficiency E6 is a dividing efficiency for the first light ray L11 at a sixth point. The fifth point and the sixth point are selected from respective sets of the first dividing points P21, P31, P41, the first dividing points P22, P32, P42, and the first dividing points P23, P33, P43. Each set of the first dividing points P21, P31, P41, the first dividing points P22, P32, P42, and the first dividing points P23, P33, P43 are included in the plurality of first dividing points P and arranged in a third propagation direction corresponding to the second predetermined direction A2 to divide the first light ray L12 propagating in the third propagation direction. The third propagation direction coincides with the second direction D2. The fifth point corresponds to the third peripheral region 83, and the sixth point is further from the first in-coupling region 51 than the fifth point is, and corresponds to the fourth peripheral region 84. In the present embodiment, each of a pair of the first dividing points P21, P41, a pair of the first dividing points P22, P42, a pair of the first dividing points P23, P43, and a pair of the first dividing points P24, P44 corresponds to a pair of the fifth point and the sixth point.

The dividing efficiency E7 is a dividing efficiency for the second light ray L21 at a seventh point. The dividing efficiency E8 is a dividing efficiency for the second light ray L21 at an eighth point. The seventh point and the eighth point are selected from respective sets of the second dividing points Q21, Q31, Q41, the second dividing points Q22, Q32, Q42, and the second dividing points Q23, Q33, Q43. Each set of the second dividing points Q21, Q31, Q41, the second dividing points Q22, Q32, Q42, and the second dividing points Q23, Q33, Q43 are included in the plurality of second dividing points Q and arranged in a fourth propagation direction corresponding to the second predetermined direction A2 to divide the second light ray L22 propagating in the fourth propagation direction. The fourth propagation direction coincides with the fourth direction D4. The seventh point corresponds to the third peripheral region 83, and the eighth point is further from the second in-coupling region 61 than the seventh point is, and corresponds to the fourth peripheral region 84. In the present embodiment, each of a pair of the second dividing points Q21, Q41, a pair of the second dividing points Q22, Q42, a pair of the second dividing points Q23, Q43, and a pair of the second dividing points Q24, Q44 corresponds to a pair of the seventh point and the eighth point.

Satisfying the above formula (3) enables reducing variation in the color uniformity regarding the second predetermined direction A2 of the field of view region 8. Additionally, when the dividing efficiency E6 is larger than the dividing efficiency E5 and the dividing efficiency E8 is larger than the dividing efficiency E7, variation in luminance regarding the second predetermined direction A2 of the field of view region 8 can be reduced.

The projection optical system 7 projects the image light ray L1 which is output from the display element 2 and forms the image. Thus, the projection optical system 7 allows the image light ray L1 from the display element 2 to be incident on the light guide 4. As shown in FIG. 1, the projection optical system 7 is located between the display element 2, and the first in-coupling region 51 and the second in-coupling region 61 of the light guide 4. The projection optical system 7 collimates the image light ray L1 from the display element 2 and allows it to be incident on the first in-coupling region 51 and the second in-coupling region 61, for example. The projection optical system 7 allows the image light ray L1 to be incident on the first in-coupling region 51 and the second in-coupling region 61 as substantial collimate light ray. The projection optical system 7 is, for example, a biconvex lens.

1.1.2 Examples

Hereinafter, examples of the light guide 4 will be described. Example 1 to Example 9 relate to the first extension region 521 and the second extension region 621. Example 1 to Example 9 are just some of feasible examples of the first extension region 521 and the second extension region 621 of the light guide 4.

1.1.2.1 Example 1

In Example 1, an out-coupling efficiency of the first extension region 521 is 80%. An out-coupling efficiency of the second extension region 621 is 80%. The number of times of dividing the first light ray L11 at the first extension region 521 and the number of times of dividing the second light ray L21 at the second extension region 621 each are 10. The number of first dividing points P and the number of second dividing points Q each are 10, too. In the first extension region 521, the internal absorptance for the first light ray L11 is 0. In the second extension region 621, the internal absorptance for the second light ray L21 is 0.2%/mm. Only for simplification, the distance between the first dividing points P and the distance between the second dividing points Q each are 10 mm.

In the first extension region 521, the dividing efficiencies of the first dividing points P are set to allow out-coupling light amounts at the first dividing points P to be equal to each other to have a same value (herein, 0.08% of an incident light amount of the first light ray L11). In the second extension region 621, the dividing efficiencies of the second dividing points Q are set to allow out-coupling light amounts at the second dividing points Q to be equal to each other to have a same value (herein, 0.08% of an incident light amount of the second light ray L21). When the out-coupling light amounts at the first dividing points P are equal to each other and the out-coupling light amounts at the second dividing points Q are equal to each other, the ratios of light amount of the second exit light ray L23 to light amount of the first exit light ray L13 at the plurality of points in the field of view region 8 becomes equal to each other. Therefore the color uniformity can be improved.

Figure 5:
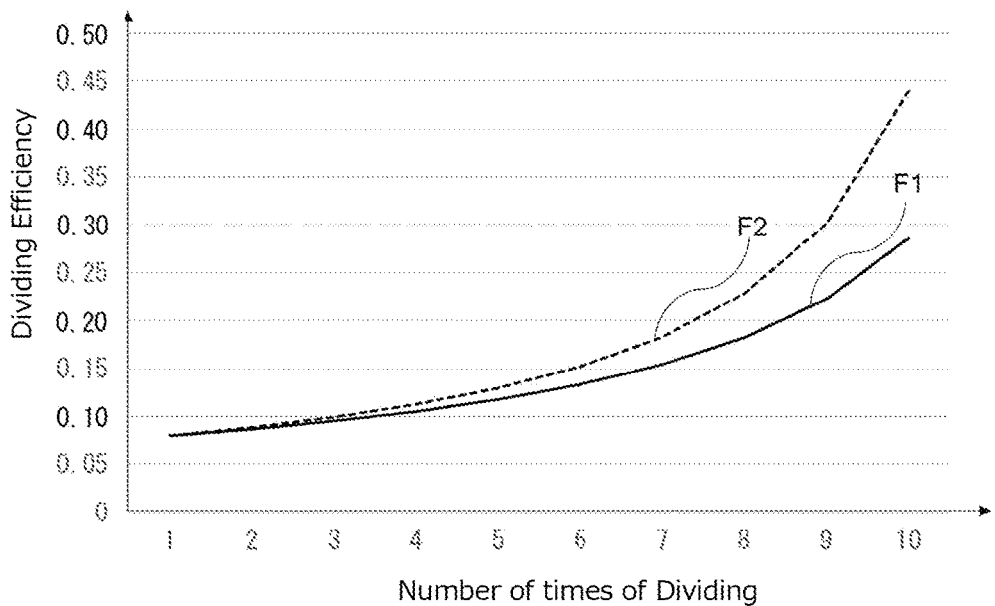
FIG. 5 is a graph of dividing efficiencies of example 1 of the light guide of the image display device of embodiment 1.

FIG. 5 is a graph of the dividing efficiencies of Example 1. In FIG. 5, curved line F1 indicates a change in the dividing efficiency relative to the number of times of dividing at the first extension region 521. Curved line F2 indicates a change in the dividing efficiency relative to the number of times of dividing at the second extension region 621. The dividing efficiency corresponding to the number of times of dividing at the first extension region 521 of "1" corresponds to the dividing efficiency E1 for the first light ray L11 at the first point. The dividing efficiency corresponding to the number of times of dividing at the first extension region 521 of "10" corresponds to the dividing efficiency E2 for the first light ray L11 at the second point. The dividing efficiency corresponding to the number of times of dividing at the second extension region 621 of "1" corresponds to the dividing efficiency E3 for the second light ray L21 at the third point. The dividing efficiency corresponding to the number of times of dividing at the second extension region 621 of "10" corresponds to the dividing efficiency E4 for the second light ray L21 at the fourth point. This also applies to Example 2 to Example 5 similarly.

In Example 1, with an increase in the number of times of dividing, the dividing efficiency of the second extension region 621 becomes higher than the dividing efficiency of the first extension region 521. In Example 1, the dividing efficiency E1 is 0.08, the dividing efficiency E2 is 0.29, the dividing efficiency E3 is 0.08, and the dividing efficiency E4 is 0.44. The dividing efficiency E2 is larger than the dividing efficiency E1. The dividing efficiency E4 is larger than the dividing efficiency E3. When the left-side value of the above formula (2) is denoted by ε, the left-side value & of the formula (2) becomes 0.65 and satisfies the formula (2).

Here, as a comparative example, a case where the dividing efficiencies at the first dividing points P are equal to each other and the dividing efficiencies at the second dividing points Q are equal to each other is considered. In the comparative example, the dividing efficiencies at the first dividing points P which allow the out-coupling efficiency of the first extension region 521 to be 80% is 0.15, and the dividing efficiencies at the second dividing points Q which allow the out-coupling efficiency of the second extension region 621 to be 80% is 0.17. In this case, the left-side value & of the formula (2) becomes 1.28 and does not satisfy the formula (2).

Figure 6:
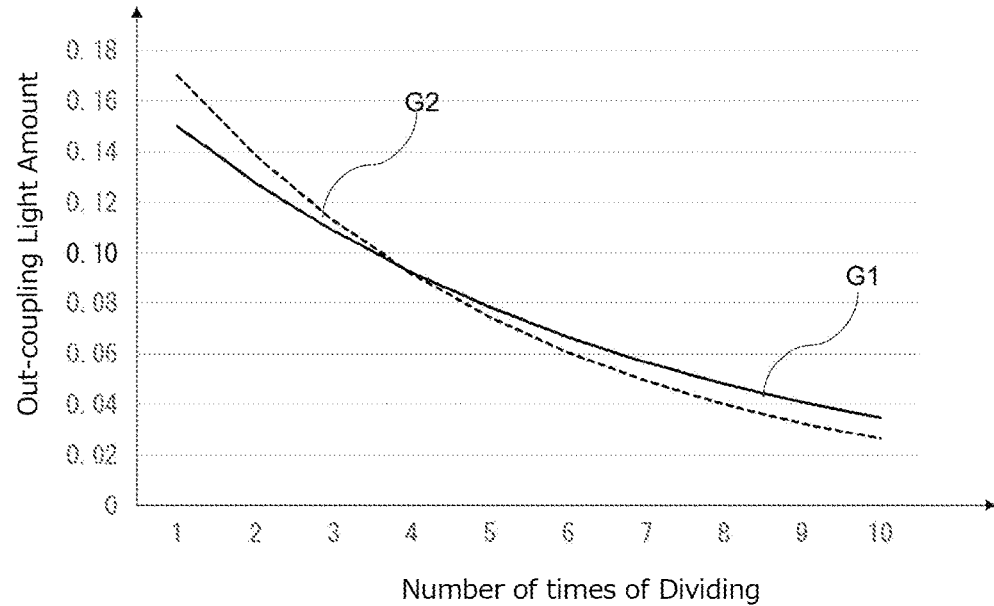
FIG. 6 is a graph of out-coupling light amount of a comparative example.
Figure 7:
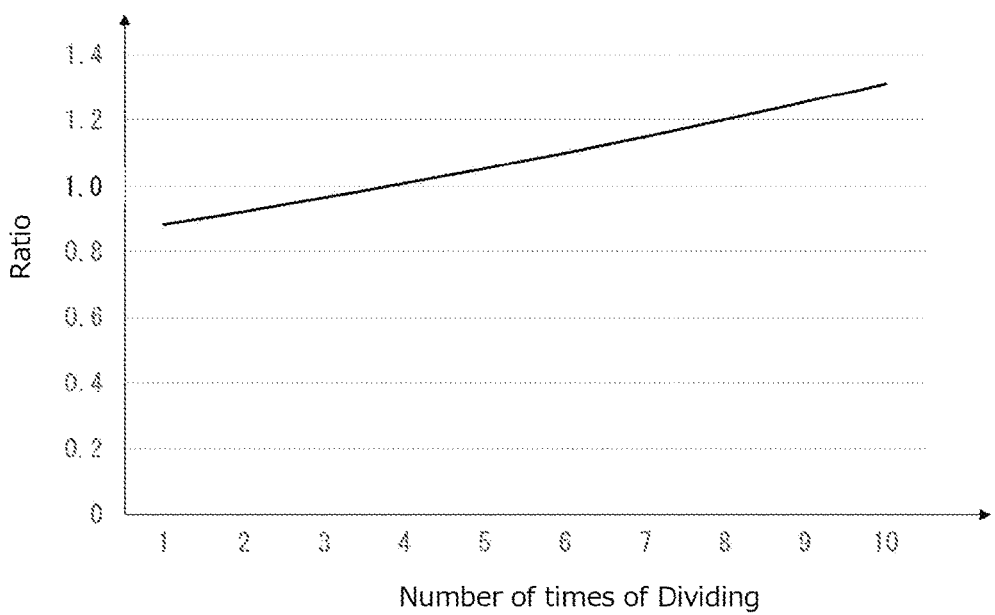
FIG. 7 is a light amount ratio of a second light ray to a first light ray of the comparative example.

FIG. 6 is a graph of the out-coupling light amount of the comparative example. In FIG. 6, curved line G1 indicates a change in the out-coupling light amount relative to the number of times of dividing at the first extension region 521. Curved line G2 indicates a change in the out-coupling light amount relative to the number of times of dividing at the second extension region 621. A numerical value of a vertical axis (the out-coupling light amount) in FIG. 6 indicates a numerical value obtained when the incident light amount of the first light ray L11 and the incident light amount of the second light ray L21 each are treated as 1. FIG. 6 shows that in the comparative example, an increase in the number of times of dividing causes decreases in the out-coupling light amounts of the first extension region 521 and the second extension region 621. FIG. 7 shows the ratios of the light amount of the first exit light ray L13 to the light amount of the second exit light ray L23 at the plurality of points in the field of view region 8, that is, a graph showing a change in the ratio of the light amount of the first light ray L11 to the light amount of the second light ray L21 in the image light ray L1 at each point in the field of view region 8. As apparent from FIG. 7, the ratios of the light amount of the first exit light ray L13 to the light amount of the second exit light ray L23 at the plurality of points in the field of view region 8 show an increase with an increase in the number of times of dividing. In summary, an increase in the number of times of dividing causes a decrease in a proportion of the second light ray L21 in the image light ray L1 at each point in the field of view region 8 and thus the color uniformity deteriorates.

1.1.2.2 Example 2

Example 2 is different from Example 1 in that the out-coupling efficiency of the second extension region 621 is 60%. In Example 2, regarding the second extension region 621, the dividing efficiencies at the second dividing points Q are set to allow the out-coupling light amounts at the second dividing points Q to be equal to each other to have a same value (herein, 0.06% of the incident light amount of the second light ray L21). Also in Example 2, the ratios of light amount of the first exit light ray L13 to light amount of the second exit light ray L23 at the plurality of points in the field of view region 8 are equal to each other. Therefore the color uniformity can be improved.

Figure 8:
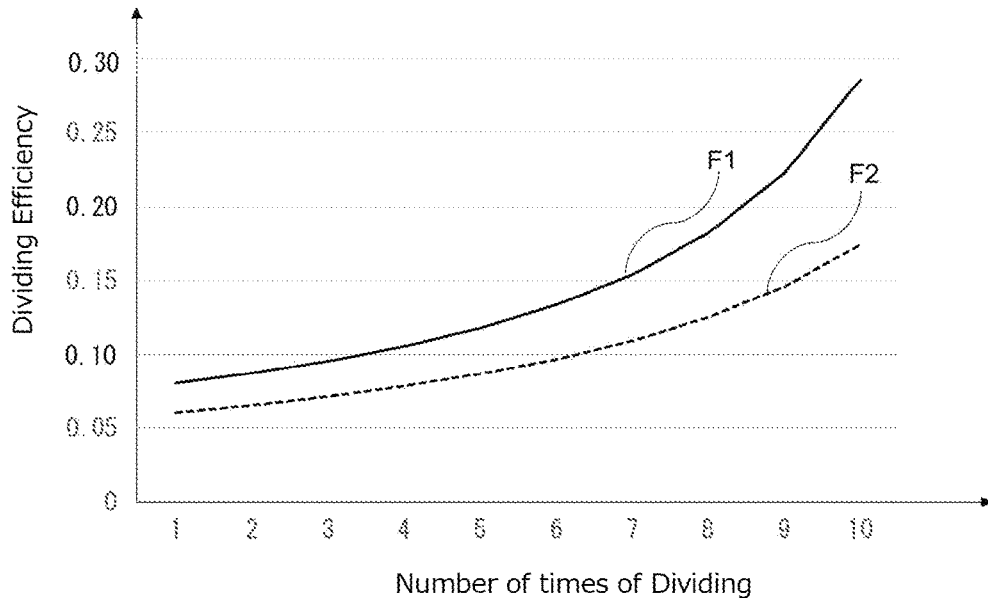
FIG. 8 is a graph of dividing efficiencies of Example 2 of the light guide of the image display device of embodiment 1.

FIG. 8 is a graph of the dividing efficiencies of Example 2. In Example 2, the dividing efficiencies of the second extension region 621 are entirely lower than the dividing efficiencies of the first extension region 521. In Example 2, the dividing efficiency E1 is 0.08, the dividing efficiency E2 is 0.29, the dividing efficiency E3 is 0.06, and the dividing efficiency E4 is 0.17. The dividing efficiency E2 is larger than the dividing efficiency E1. The dividing efficiency E4 is larger than the dividing efficiency E3. The left-side value & of the formula (2) becomes 0.69 and satisfies the formula (2).

1.1.2.3 Example 3

Example 3 is different from Example 1 in that the internal absorptance for the second light ray L21 of the second extension region 621 is 0.1%/mm. Also in Example 3, the ratios of light amount of the first exit light ray L13 to light amount of the second exit light ray L23 at the plurality of points in the field of view region 8 are equal to each other. Therefore the color uniformity can be improved.

Figure 9:
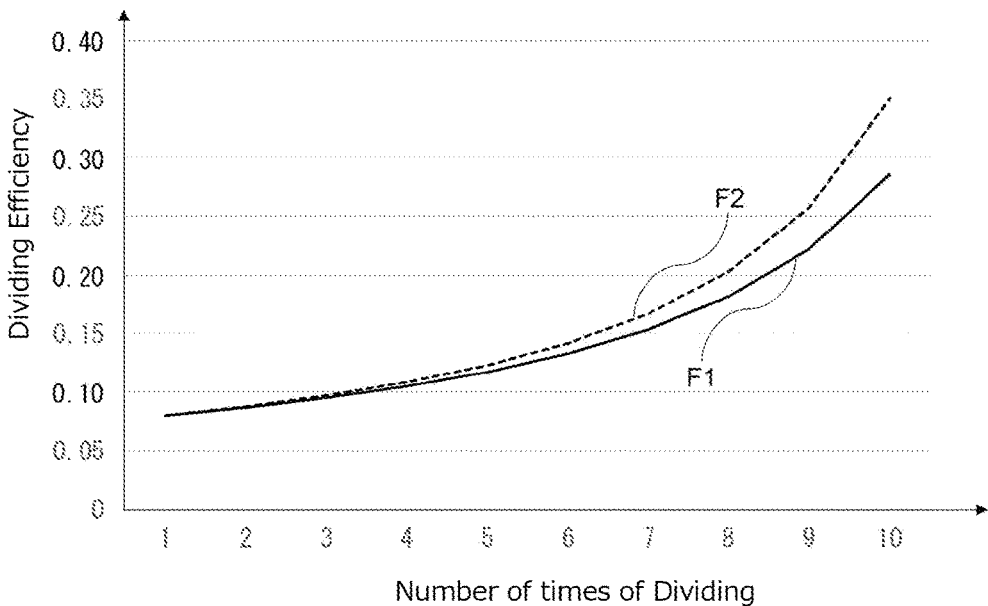
FIG. 9 is a graph of dividing efficiencies of Example 3 of the light guide of the image display device of embodiment 1.

FIG. 9 is a graph of the dividing efficiencies of Example 3. In Example 3, with an increase in the number of times of dividing, the dividing efficiency of the second extension region 621 becomes higher than the dividing efficiency of the first extension region 521 but is not so high as Example 1. In Example 3, the dividing efficiency E1 is 0.08, the dividing efficiency E2 is 0.29, the dividing efficiency E3 is 0.08, and the dividing efficiency E4 is 0.35. The dividing efficiency E2 is larger than the dividing efficiency E1. The dividing efficiency E4 is larger than the dividing efficiency E3. The left-side value & of the formula (2) becomes 0.82 and satisfies the formula (2).

1.1.2.4 Example 4

Example 4 is different from Example 1 in that the out-coupling efficiency of the first extension region 521 is 60%. In Example 4, regarding the first extension region 521, the dividing efficiencies at the first dividing points P are set to allow the out-coupling light amounts at the first dividing points P to be equal to each other to have a same value (herein, 0.06% of the incident light amount of the first light ray L11). Also in Example 4, the ratios of light amount of the first exit light ray L13 to light amount of the second exit light ray L23 at the plurality of points in the field of view region 8 are equal to each other. Therefore the color uniformity can be improved.

Figure 10:
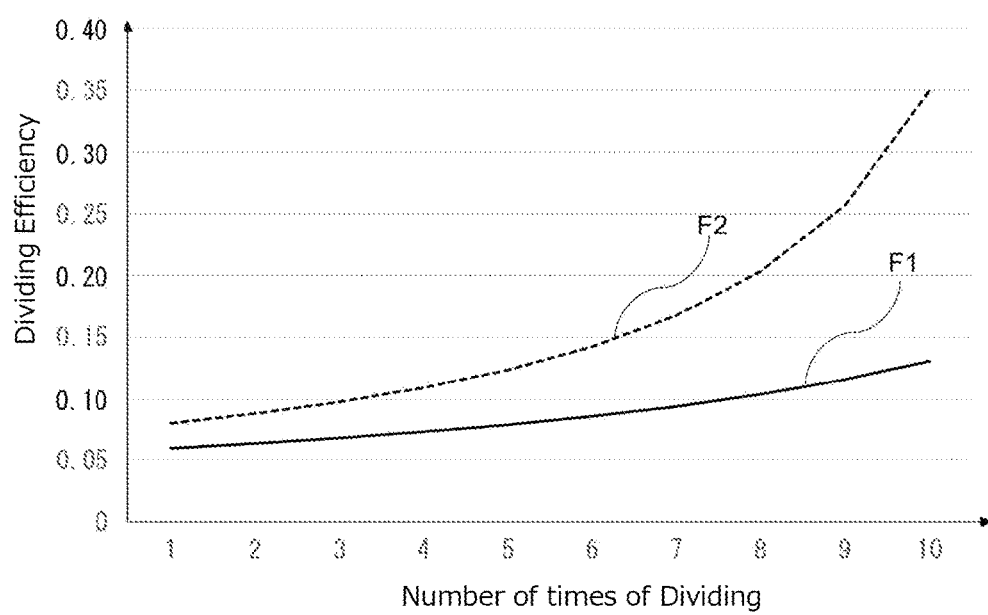
FIG. 10 is a graph of dividing efficiencies of Example 4 of the light guide of the image display device of embodiment 1.

FIG. 10 is a graph of the dividing efficiencies of Example 4. In Example 4, the dividing efficiencies of the second extension region 621 are entirely higher than the dividing efficiencies of the first extension region 521. In Example 4, the dividing efficiency E1 is 0.06, the dividing efficiency E2 is 0.13, the dividing efficiency E3 is 0.08, and the dividing efficiency E4 is 0.35. The dividing efficiency E2 is larger than the dividing efficiency E1. The dividing efficiency E4 is larger than the dividing efficiency E3. The left-side value & of the formula (2) becomes 0.88 and satisfies the formula (2).

1.1.2.5 Example 5

Example 5 is different from Example 1 in that the out-coupling efficiencies of the first extension region 521 and the second extension region 621 each are 60% and that the internal absorptance for the second light ray L21 of the second extension region 621 is 0.3%/mm. In Example 5, regarding the first extension region 521, the dividing efficiencies at the first dividing points P are set to allow the out-coupling light amounts at the first dividing points P to be equal to each other to have a same value (herein, 0.06% of the incident light amount of the first light ray L11). Regarding the second extension region 621, the dividing efficiencies at the second dividing points Q are set to allow the out-coupling light amounts at the second dividing points Q to be equal to each other to have a same value (herein, 0.06% of the incident light amount of the second light ray L21). Also in Example 5, the ratios of light amount of the first exit light ray L13 to light amount of the second exit light ray L23 at the plurality of points in the field of view region 8 are equal to each other. Therefore the color uniformity can be improved.

Figure 11:
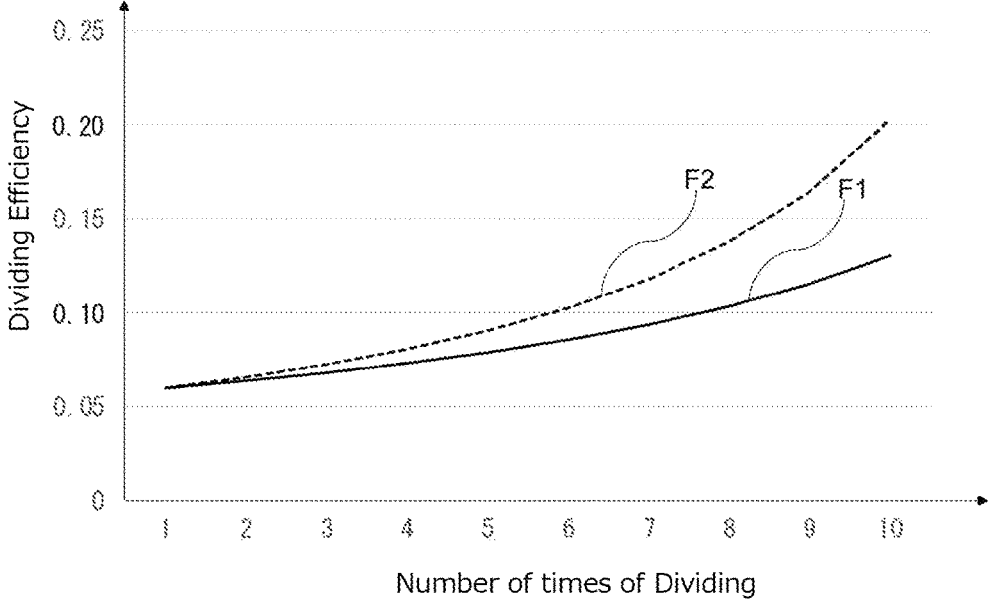
FIG. 11 is a graph of dividing efficiencies of Example 5 of the light guide of the image display device of embodiment 1.

FIG. 11 is a graph of the dividing efficiencies of Example 5. In Example 5, similarly to Example 1, with an increase in the number of times of dividing, the dividing efficiency of the second extension region 621 becomes higher than the dividing efficiency of the first extension region 521. In Example 5, the dividing efficiency E1 is 0.06, the dividing efficiency E2 is 0.13, the dividing efficiency E3 is 0.06, and the dividing efficiency E4 is 0.20. The dividing efficiency E2 is larger than the dividing efficiency E1. The dividing efficiency E4 is larger than the dividing efficiency E3. The left-side value & of the formula (2) becomes 0.64 and satisfies the formula (2).

1.1.2.6 Example 6

In Example 6, the out-coupling efficiency of the first extension region 521 is 60%. The out-coupling efficiency of the second extension region 621 is 60%. The number of times of dividing the first light ray L11 at the first extension region 521 and the number of times of dividing the second light ray L21 at the second extension region 621 each are 15. The number of first dividing points P and the number of second dividing points Q each are 15, too. In the first extension region 521, the internal absorptance for the first light ray L11 is 0. In the second extension region 621, the internal absorptance for the second light ray L21 is 0.1%/mm. Only for simplification, the distance between the first dividing points P and the distance between the second dividing points Q each are 10 mm.

In the first extension region 521, the dividing efficiencies of the first dividing points P are set to allow the out-coupling light amounts at the first dividing points P to be equal to each other to have a same value (herein, 0.04% of the incident light amount of the first light ray L11). In the second extension region 621, the dividing efficiencies of the second dividing points Q are set to allow the out-coupling light amounts at the second dividing points Q to be equal to each other to have a same value (herein, 0.04% of the incident light amount of the second light ray L21). Also in Example 6, the ratios of light amount of the first exit light ray L13 to light amount of the second exit light ray L23 at the plurality of points in the field of view region 8 are equal to each other. Therefore the color uniformity can be improved.

Figure 12:
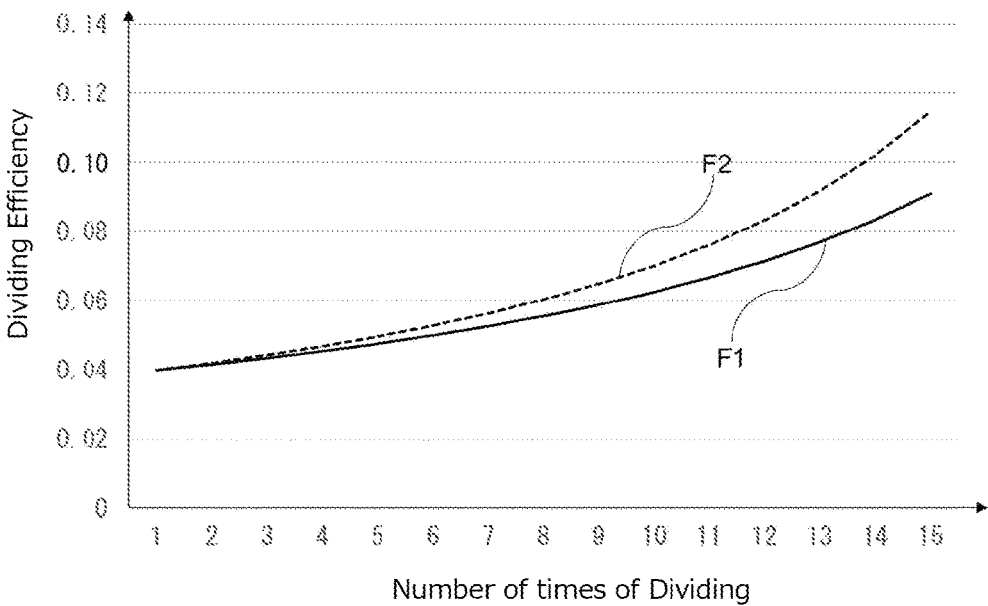
FIG. 12 is a graph of dividing efficiencies of Example 6 of the light guide of the image display device of embodiment 1.

FIG. 12 is a graph of the dividing efficiencies of Example 6. In FIG. 12, curved line F1 indicates a change in the dividing efficiency relative to the number of times of dividing at the first extension region 521. Curved line F2 indicates a change in the dividing efficiency relative to the number of times of dividing at the second extension region 621. The dividing efficiency corresponding to the number of times of dividing at the first extension region 521 of "1" corresponds to the dividing efficiency E1 for the first light ray L11 at the first point. The dividing efficiency corresponding to the number of times of dividing at the first extension region 521 of "15" corresponds to the dividing efficiency E2 for the first light ray L11 at the second point. The dividing efficiency corresponding to the number of times of dividing at the second extension region 621 of "1" corresponds to the dividing efficiency E3 for the second light ray L21 at the third point. The dividing efficiency corresponding to the number of times of dividing at the second extension region 621 of "15" corresponds to the dividing efficiency E4 for the second light ray L21 at the fourth point. This also applies to Example 7 to Example 9 similarly.

In Example 6, with an increase in the number of times of dividing, the dividing efficiency of the second extension region 621 becomes higher than the dividing efficiency of the first extension region 521. In Example 6, the dividing efficiency E1 is 0.04, the dividing efficiency E2 is 0.09, the dividing efficiency E3 is 0.04, and the dividing efficiency E4 is 0.11. The dividing efficiency E2 is larger than the dividing efficiency E1. The dividing efficiency E4 is larger than the dividing efficiency E3. The left-side value & of the formula (2) becomes 0.79 and satisfies the formula (2).

1.1.2.7 Example 7

Example 7 is different from Example 6 in that the internal absorptance for the second light ray L21 of the second extension region 621 is 0.3%/mm. Also in Example 7, the ratios of light amount of the first exit light ray L13 to light amount of the second exit light ray L23 at the plurality of points in the field of view region 8 are equal to each other. Therefore the color uniformity can be improved.

Figure 13:
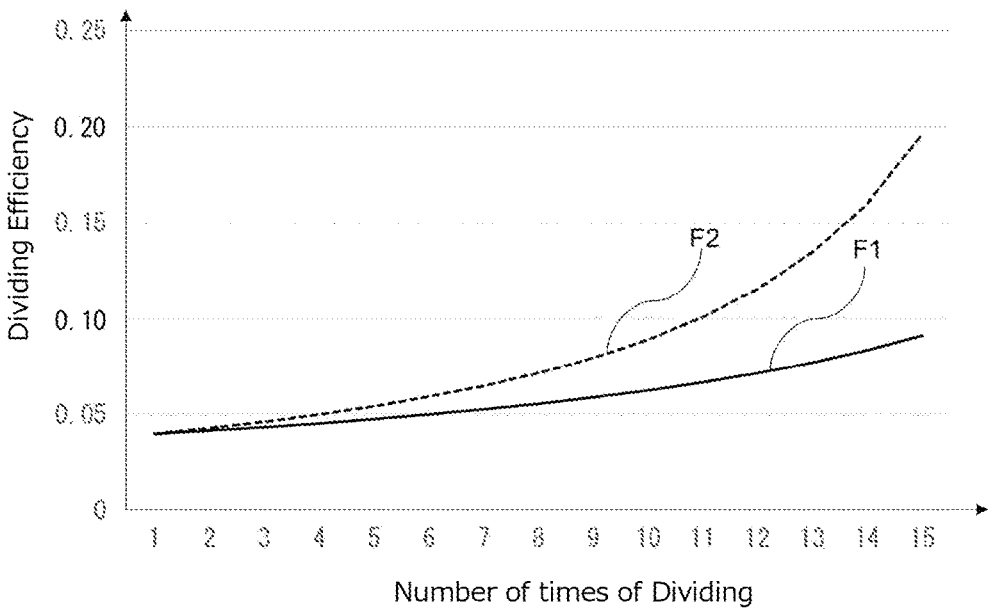
FIG. 13 is a graph of dividing efficiencies of Example 7 of the light guide of the image display device of embodiment 1.

FIG. 13 is a graph of the dividing efficiencies of Example 7. In Example 7, with an increase in the number of times of dividing, the dividing efficiency of the second extension region 621 becomes higher than the dividing efficiency of the first extension region 521 but is higher than that of Example 6. In Example 7, the dividing efficiency E1 is 0.04, the dividing efficiency E2 is 0.09, the dividing efficiency E3 is 0.04, and the dividing efficiency E4 is 0.20. The dividing efficiency E2 is larger than the dividing efficiency E1. The dividing efficiency E4 is larger than the dividing efficiency E3. The left-side value & of the formula (2) becomes 0.46 and satisfies the formula (2). [1.1.2.8 Example 8]

Example 8 is different from Example 6 in that the out-coupling efficiency of the first extension region 521 is 75%. In Example 8, regarding the first extension region 521, the dividing efficiencies at the first dividing points P are set to allow the out-coupling light amounts at the first dividing points P to be equal to each other to have a same value (herein, 0.05% of the incident light amount of the first light ray L11). Also in Example 8, the ratios of light amount of the first exit light ray L13 to light amount of the second exit light ray L23 at the plurality of points in the field of view region 8 are equal to each other. Therefore the color uniformity can be improved.

Figure 14:
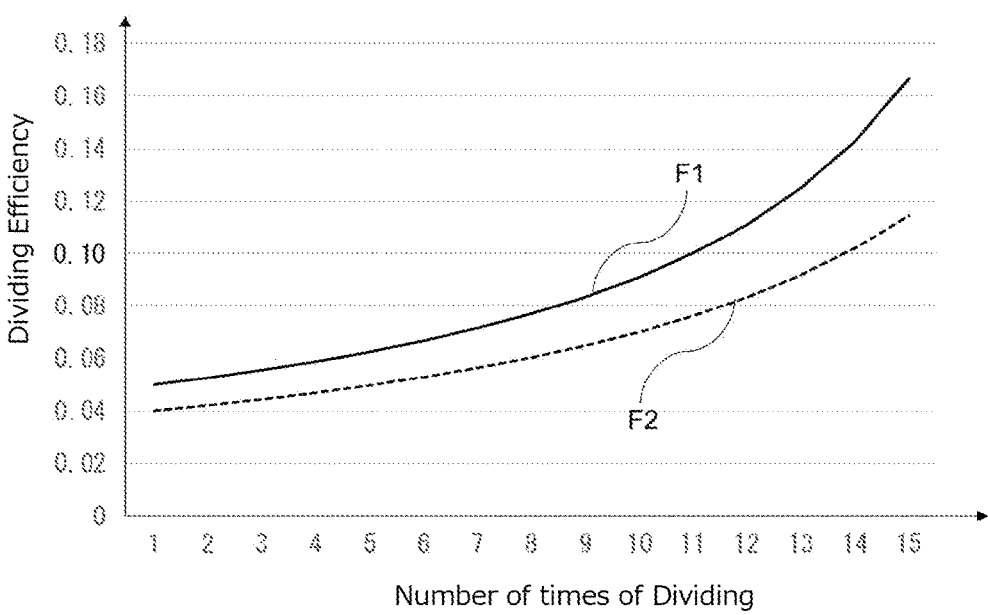
FIG. 14 is a graph of dividing efficiencies of Example 8 of the light guide of the image display device of embodiment 1.

FIG. 14 is a graph of the dividing efficiencies of Example 8. In Example 8, the dividing efficiencies of the second extension region 621 are entirely lower than the dividing efficiencies of the first extension region 521. In Example 8, the dividing efficiency E1 is 0.05, the dividing efficiency E2 is 0.17, the dividing efficiency E3 is 0.04, and the dividing efficiency E4 is 0.11. The dividing efficiency E2 is larger than the dividing efficiency E1. The dividing efficiency E4 is larger than the dividing efficiency E3. The left-side value & of the formula (2) becomes 0.74 and satisfies the formula (2).

1.1.2.9 Example 9

Example 9 is different from Example 8 in that the internal absorptance for the second light ray L21 of the second extension region 621 is 0.3%/mm. Also in Example 9, the ratios of light amount of the first exit light ray L13 to light amount of the second exit light ray L23 at the plurality of points in the field of view region 8 are equal to each other. Therefore the color uniformity can be improved.

Figure 15:
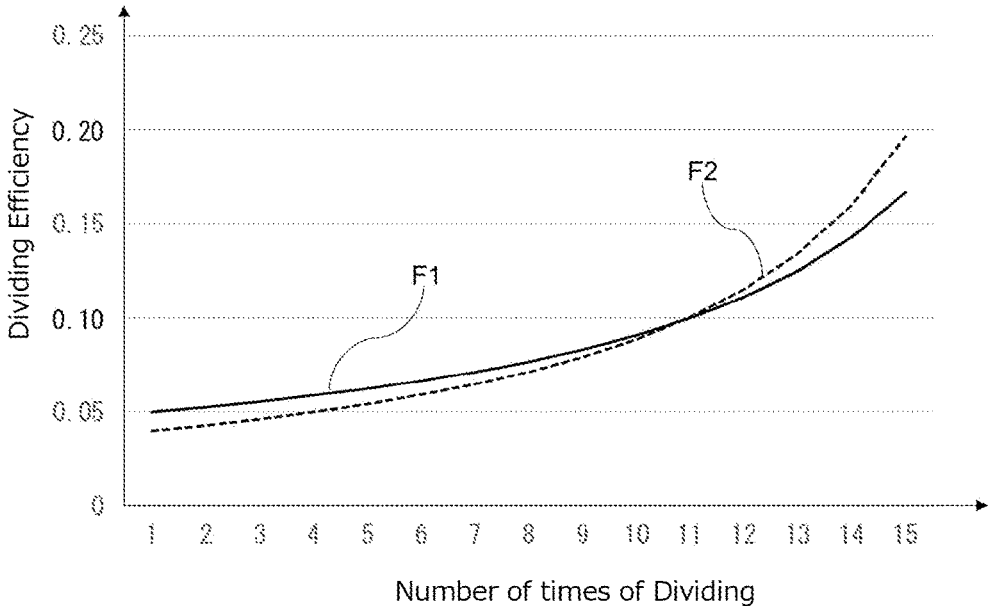
FIG. 15 is a graph of dividing efficiencies of Example 9 of the light guide of the image display device of embodiment 1.

FIG. 15 is a graph of the dividing efficiencies of Example 9. In Example 9, while the number of times of dividing is small, the dividing efficiency of the second extension region 621 is lower than the dividing efficiency of the first extension region 521. However, with an increase in the number of times of dividing, the dividing efficiency of the second extension region 621 becomes higher than the dividing efficiency of the first extension region 521. In Example 9, the dividing efficiency E1 is 0.05, the dividing efficiency E2 is 0.17, the dividing efficiency E3 is 0.04, and the dividing efficiency E4 is 0.20. The dividing efficiency E2 is larger than the dividing efficiency E1. The dividing efficiency E4 is larger than the dividing efficiency E3. The left-side value & of the formula (2) becomes 0.43 and satisfies the formula (2).

1.1.2.10 Other Examples

Example 1 to Example 9 each relate to the first extension region 521 and the second extension region 621. However, conditions of Example 1 to Example 9 can apply to the first exit region 522 and the second exit region 622 of the light guide 4. In summary, the first exit region 522 and the second exit region 622 may be configured similarly to the first extension region 521 and the second extension region 621. The above Example 1 to Example 9 can apply to the first exit region 522 and the second exit region 622 with the dividing efficiencies E1, E2, E3, E4 being replaced with the dividing efficiencies E5, E6, E7, E8.

In Example 1 to Example 9, the dividing efficiencies of the first extension region 521 and the second extension region 621 increase monotonically with an increase in the number of times of dividing. However, the dividing efficiency does not necessarily continue to increase with an increase in the number of times of dividing, but may include unchanged (flat) part.

1.1.3 Advantageous Effects

The aforementioned optical system 3 includes the light guide 4 for guiding the image light ray L1 which is output from the display element 2 and forms an image, to the field of view region 8 of the user as a virtual image. The image light ray L1 includes the first light ray L11 with the first wavelength range and the second light ray L21 with the second wavelength range having wavelengths shorter than wavelengths in the first wavelength range. The light guide 4 includes the first in-coupling region 51, the first dividing region 52, the second in-coupling region 61, and the second dividing region 62. The first in-coupling region 51 allows the first light ray L11 of the image light ray L1 to enter the light guide 4 so that the first light ray L11 propagates within the light guide 4. The first dividing region 52 includes the plurality of first dividing points P which divide the first light ray L11 entering the light guide 4 from the first in-coupling region 51 and allows the plurality of first exit light rays L13 to emerge toward the field of view region 8. The second in-coupling region 61 allows the second light ray L21 of the image light ray L1 to enter the light guide 4 so that the second light ray L21 propagates within the light guide 4. The second dividing region 62 includes the plurality of second dividing points Q which divide the second light ray L21 entering the light guide 4 from the second in-coupling region 61 and allows the plurality of second exit light rays L23 to emerge toward the field of view region 8. The field of view region 8 includes the first peripheral region 81 on a side of the first end 8a in the predetermined direction A1 within the plane of the field of view region 8 and the second peripheral region 82 on a side of the second end 8b in the predetermined direction A1. The plurality of first dividing points P include the first dividing point P11 (first point) and the first dividing point P14 (second point) which are arranged in the first direction D1 (first propagation direction) corresponding to the predetermined direction A1 to divide the first light ray L11 propagating in the first direction D1 (first propagation direction). The first dividing point P11 (first point) corresponds to the point R21, R31, R41 within the first peripheral region 81. The first dividing point P14 (second point) is further from the first in-coupling region 51 than the first dividing point P11 (first point) is, and corresponds to the point R24, R34, R44 within the second peripheral region 82. The plurality of second dividing points Q include the second dividing point Q11 (third point) and the fourth point Q14 (fourth point) which are arranged in the third direction D3 (second propagation direction) corresponding to the predetermined direction A1 to divide the second light ray L21 propagating in the third direction D3 (second propagation direction). The second dividing point Q11 (third point) corresponds to the point R21, R31, R41 within the first peripheral region 81. The second dividing point Q14 (fourth point) is further from the second in-coupling region 61 than the second dividing points Q11 (third point) is, and corresponds to the point R24, R34, R44 within the second peripheral region 82. When the dividing efficiency for the first light ray L11 at the first dividing point P11 (first point) is denoted by E1, the dividing efficiency for the first light ray L11 at the first dividing point P14 (second point) is denoted by E2, the dividing efficiency for the second light ray L21 at the second dividing point Q11 (third point) is denoted by E3, and the dividing efficiency for the second light ray L21 at the second dividing point Q14 (fourth point) is denoted by E4, the dividing efficiencies E1, E2, E3, and E4 satisfy the following formula (4).

[FORMULA 4]

$$\left(\frac{E2}{E1}\right) \div \left(\frac{E4}{E3}\right) \times \left(\frac{E3}{E1}\right)^2 < 0.9 \tag{4}$$

This configuration enables improvement of the color uniformity.

In the optical system 3, the dividing efficiency E2 is larger than the dividing efficiency E1. The dividing efficiency E4 is larger than the dividing efficiency E3. This configuration enables improvement of luminance uniformity regarding the first predetermined direction A1 of the field of view region 8.

In the optical system 3, the first dividing point P11 (first point) and the second dividing point Q11 (third point) correspond to a same point R21, R31, R41 within the first peripheral region 81. The first dividing point P14 (second point) and the second dividing point Q14 (fourth point) correspond to a same point R24, R34, R44 within the second peripheral region 82. This configuration enables further improvement of color uniformity.

In the optical system 3, the first peripheral region 81 occupies a quarter of the field of view region 8 from the first end 8a of the field of view region 8 in the first predetermined direction A1. The second peripheral region 82 occupies a quarter of the field of view region 8 from the second end 8b of the field of view region 8 in the first predetermined direction A1. This configuration enables further improvement of color uniformity.

In the optical system 3, the first dividing region 52 includes the first extension region 521 and the first exit region 522. The first extension region 521 divides the first light ray L11 propagating within the light guide 4 into a plurality of first light rays L12 arranged in the first direction D1 perpendicular to the thickness direction of the light guide 4 and allows the plurality of first light rays L12 arranged in the first direction D1 to travel toward the first exit region 522. The first exit region 522 divides the plurality of first light rays L12 from the first extension region 521 into a plurality of first light rays L12 arranged in the second direction D2 perpendicular to the thickness direction of the light guide 4 and intersecting the first direction D1 and allows the plurality of first light rays L12 arranged in the second direction D2 to emerge toward the field of view region 8 as the plurality of first exit light rays L13. The second dividing region 62 includes the second extension region 621 and the second exit region 622. The second extension region 621 divides the second light ray L21 propagating within the light guide 4 into a plurality of second light rays L22 arranged in the third direction D3 corresponding to the first direction D1 and allows the plurality of second light rays L22 arranged in the third direction D3 to travel toward the second exit region 622. The second exit region 622 divides the plurality of second light rays L22 from the second extension region 621 into a plurality of second light rays L22 arranged in the fourth direction D4 corresponding to the second direction D2 and allows the plurality of second light rays L22 arranged in the fourth direction D4 to emerge toward the field of view region 8 as the plurality of second exit light rays L23. The first extension region 521 includes the first point and the second point while the second extension region 621 includes the third point and the fourth point. This configuration enables expansion of the pupil of the image light ray L1 in two directions.

In the optical system 3, the length in the first direction D1 of the first extension region 521, the length in the second direction D2 of the first exit region 522, the length in the third direction D3 of the second extension region 621, and the length in the fourth direction D4 of the second exit region 622 is equal to or longer than 100 mm. This configuration enables provision of the field of view region 8 with a sufficient size to the user.

In the optical system 3, the field of view region 8 including the third peripheral region 83 on a side of the third end 8c in the second predetermined direction A2 intersecting the first predetermined direction A1 being the predetermined direction A1 within the plane of the field of view region 8 and the fourth peripheral region 84 on a side of the fourth end 8d in the second predetermined direction A2. The plurality of first dividing points P include the first dividing points P21 to P24 (fifth point) and the first dividing points P41 to P44 (sixth point) which are arranged in the second direction D2 (third propagation direction) corresponding to the second predetermined direction A2 to divide a first light ray L12 propagating in the second direction D2 (third propagation direction). The first dividing points P21 to P24 (fifth point) correspond to the points R21, R22, R23, R24 within the third peripheral region 83. The first dividing points P41 to P44 (sixth point) are further from the first in-coupling region 51 than the first dividing points P21 to P24 (fifth point) are, and correspond to the points R41, R42, R43, R44 within the fourth peripheral region 84. The plurality of second dividing points Q include the second dividing points Q21 to Q24 (seventh point) and the second dividing points Q41 to Q44 (eighth point) which are arranged in the fourth direction D4 (fourth propagation direction) corresponding to the second predetermined direction A2 to divide a second light ray L22 propagating in the fourth direction D4 (fourth propagation direction). The second dividing points Q21 to Q24 (seventh point) correspond to the points R21, R22, R23, R24 within the third peripheral region 83. The second dividing points Q41 to Q44 (eighth point) are further from the second in-coupling region 61 than the second dividing points Q21 to Q24 (seventh point) are, and correspond to the points R41, R42, R43, R44 within the fourth peripheral region 84. When the dividing efficiency for the first light ray L12 at the first dividing points P21 to P24 (fifth point) is denoted by E5, the dividing efficiency for the first light ray L12 at the first dividing points P41 to P44 (sixth point) is denoted by E6, the dividing efficiency for the second light ray L22 at the second dividing points Q21 to Q24 (seventh point) is denoted by E7, and the dividing efficiency for the second light ray L22 at the second dividing points Q41 to Q44 (eighth point) is denoted by E8, the dividing efficiencies E5, E6, E7, and E8 satisfy the following formula (5).

[FORMULA 5]

$$\left(\frac{E6}{E5}\right) \div \left(\frac{E8}{E7}\right) \times \left(\frac{E7}{E5}\right)^2 < 0.9 \qquad (5)$$

The first extension region 521 includes the first dividing point P11 (first point) and the first dividing point P14 (second point) while the second extension region 621 includes the second dividing point Q11 (third point) and the second dividing point Q14 (fourth point). The first exit region 522 includes the first dividing points P21 to P24 (fifth point) and the first dividing points P41 to P44 (sixth point) while the second exit region 622 includes the second dividing points Q21 to Q24 (seventh point) and the second dividing points Q41 to Q44 (eighth point). This configuration enables improvement of color uniformity.

In the optical system 3, the dividing efficiency E6 is larger than the dividing efficiency E5. The dividing efficiency E8 is larger than the dividing efficiency E7. This configuration enables improvement of luminance uniformity regarding the second predetermined direction A2 in the field of view region 8.

In the optical system 3, the first dividing points P21 to P24 (fifth point) and the second dividing points Q21 to Q24 (seventh point) correspond to same points R21 to R24 within the third peripheral region 83. The first dividing points P41 to P44 (sixth point) and the second dividing points Q41 to Q44 (eighth point) correspond to same points R41 to R44 within the fourth peripheral region 84. This configuration enables improvement of color uniformity.

In the optical system 3, the third peripheral region 83 occupies a quarter of the field of view region 8 from the third end 8c of the field of view region 8 in the second predetermined direction A2. The fourth peripheral region 84 occupies a quarter of the field of view region 8 from the fourth end 8d of the field of view region 8 in the second predetermined direction A2. This configuration enables improvement of color uniformity.

In the optical system 3, the light guide 4 includes the first and second substrates 5, 6 facing each other with the air layer 41 in-between. The first in-coupling region 51 and the first dividing region 52 are provided to the first substrate 5. The second in-coupling region 61 and the second dividing region 62 are provided to the second substrate 6. This configuration enables improvement of color uniformity.

In the optical system 3, the first dividing region 52 includes, as a structure defining the plurality of first dividing points P, a diffraction grating. The second dividing region 62 includes, as a structure defining the plurality of second dividing points Q, a diffraction grating. This configuration enables improvement of color uniformity.

In the optical system 3, the first wavelength range is between 510 nm and 780 nm inclusive. The second wavelength range is between 380 nm and 480 nm inclusive. This configuration enables improvement of color uniformity.

In the optical system 3, the refractive index for d-line of the light guide 4 is larger than 1.7. This configuration enables reducing an area of the field of view region 8 where no pupil of the image light ray L1 is located.

In the optical system 3, the internal absorptance for the second light ray L21 of the light guide 4 is larger than 0.05%/mm and is smaller than 0.50%/mm. This configuration enables improvement of color uniformity.

The optical system 3 further includes the projection optical system 7 allowing the image light ray L1 to be incident on the first in-coupling region 51 and the second in-coupling region 61 of the light guide 4 as a substantial collimate light ray. This configuration enables improvement of color uniformity.

In the optical system 3, the plurality of first exit light rays L13 are parallel to each other. The plurality of second exit light rays L23 are parallel to each other. This configuration enables reducing an area of the field of view region 8 where no pupil of the image light ray L1 is located.

The aforementioned image display device 1 includes the optical system 3 and the display element 2. This configuration enables improvement of color uniformity.

1.2 Embodiment 2

1.2.1 Configurations

Figure 16:
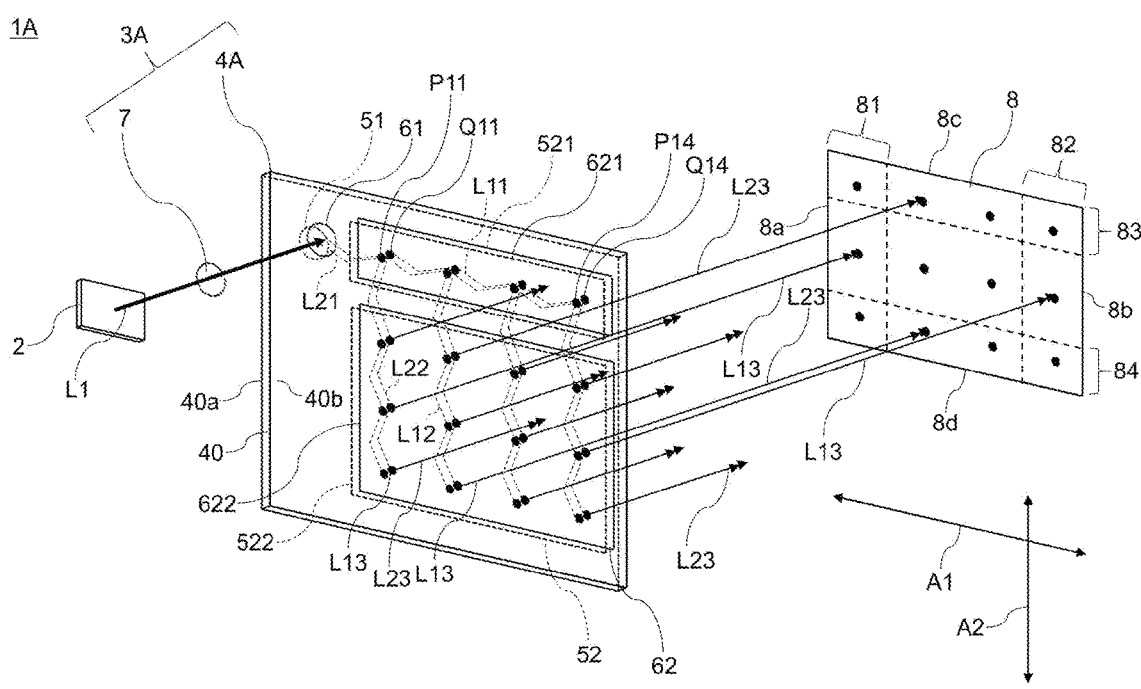
FIG. 16 is a schematic perspective view of an image display device of embodiment 2.

FIG. 16 is a schematic view of a configuration example of an image display device 1A. The image display device 1A is different from the image display device 1 in that the image display device 1A includes an optical system 3A different from the optical system 3 of the image display device 1. The optical system 3A is different from the optical system 3 in that the optical system 3A includes a light guide 4A different from the light guide 4 of the optical system 3.

Similarly to the light guide 4, the light guide 4A is configured to guide the image light ray L1 which is output from the display element 2 and forms an image, toward the field of view region 8 of the user as a virtual image. The light guide 4A of FIG. 16 is constituted by a single substrate.

The light guide 4A includes a body 40, the first in-coupling region 51, the first dividing region 52, the second in-coupling region 61, and the second dividing region 62.

The body 40 is made of material transparent for a visible light region and includes a first surface 40a and a second surface 40b in a thickness direction thereof. In the present embodiment, the first surface 40a is treated as a front surface of the light guide 4A, and the second surface 40b is treated as a back surface of the light guide 4A. A refractive index for d-line (wavelength of 587.562 nm) of the body 40 is larger than 1.7. An internal absorptance for the first light ray L11 of the body 40 is substantially zero. An internal absorptance for the second light ray L21 of the body 40 is larger than 0.05%/mm and smaller than 0.50%/mm. In the present embodiment, the body 40 has a rectangular plate shape. As shown in FIG. 16, the body 40 is positioned or arranged to direct the first surface 40a toward the display element 2 and direct the second surface 40b toward the field of view region 8.

Figure 17:
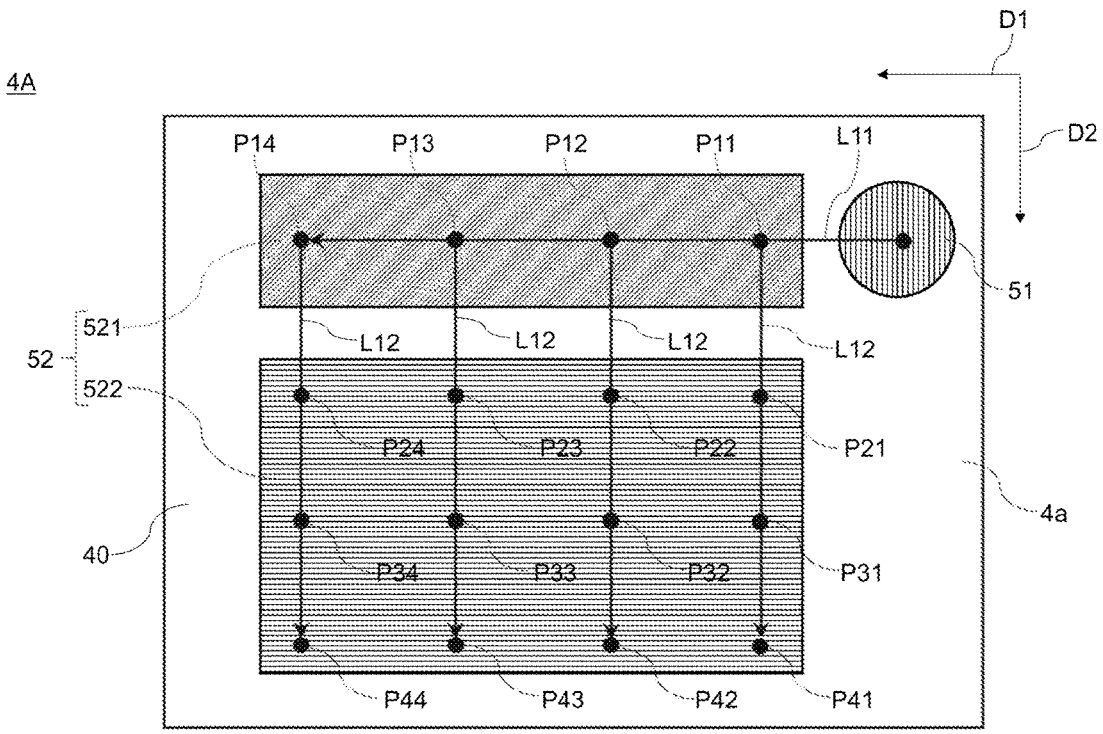
FIG. 17 is a front view of a light guide of the image display device of FIG. 16.

FIG. 17 is a front view of the light guide 4A when viewed from the display element 2. The first in-coupling region 51 and the first dividing region 52 are provided to the first surface 40a of the body 40. In the present embodiment, the first in-coupling region 51 and the first dividing region 52 are formed in or on the first surface 40a of the body 40. The first in-coupling region 51 and the first dividing region 52 are not necessarily formed by processing the first surface 40a of the body 40 as such, but may be provided by bonding a separate part to the first surface 40a of the body 40.

Figure 18:
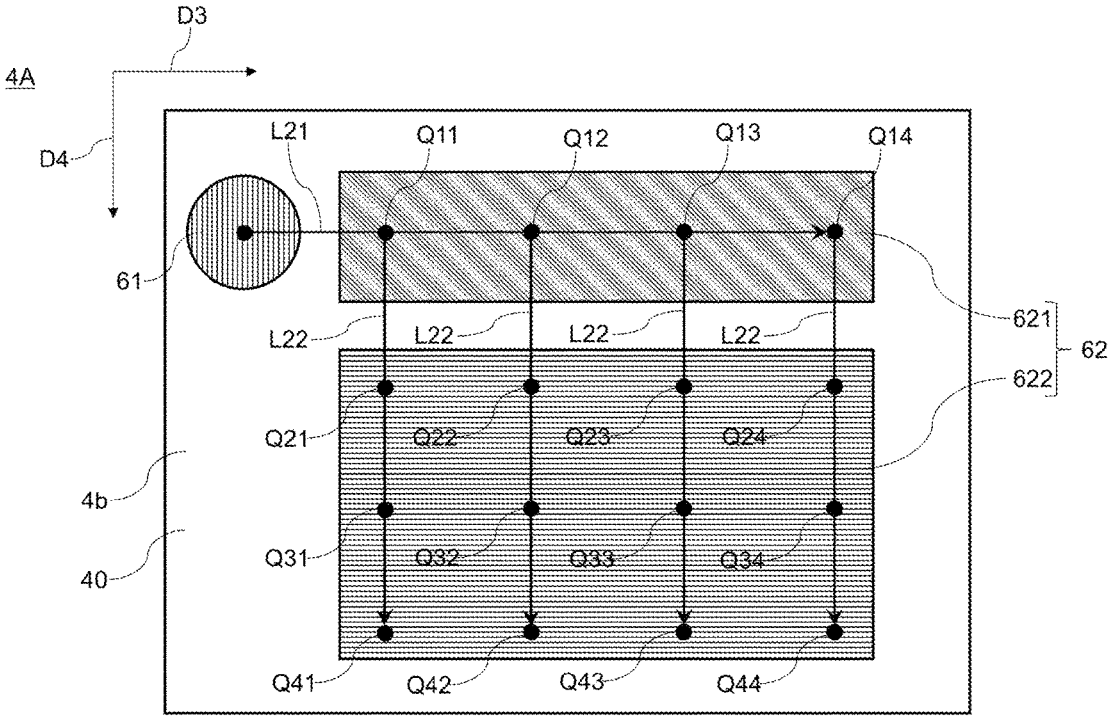
FIG. 18 is a back view of the light guide of the image display device of FIG. 16.

FIG. 18 is a rear view of the light guide 4A when viewed from the field of view region 8. The second in-coupling region 61 and the second dividing region 62 are provided to the second surface 40b of the body 40. In the present embodiment, the second in-coupling region 61 and the second dividing region 62 are formed in or on the second surface 40b of the body 40. The second in-coupling region 61 and the second dividing region 62 are not necessarily formed by processing the second surface 40b of the body 40 as such, but may be provided by bonding a separate part to the second surface 40b of the body 40.

In the light guide 4A of FIG. 16, when viewed in the thickness direction of the light guide 4A, the first in-coupling region 51 and the first dividing region 52 (the first extension region 521 and the first exit region 522) overlap with the second in-coupling region 61 and the second dividing region 62 (the second extension region 621 and the second exit region 622), respectively.

The image light ray L1 from the display element 2 is incident on the first in-coupling region 51 of the first surface 40a of the light guide 4A. The first in-coupling region 51 allows the first light ray L11 of the image light ray L1 to travel toward the first dividing region 52. In the first dividing region 52, the first extension region 521 divides the first light ray L11 from the first in-coupling region 51 into the plurality of first light rays L12 at the plurality of first dividing points P11 to P14 and allows the plurality of first light rays L12 to travel toward the first exit region 522. The first exit region 522 divides the plurality of first light rays L12 at the plurality of first dividing points P21 to P24, P31 to P34, P41 to P44 to allow the plurality of first exit light rays L13 to emerge toward the field of view region 8. The image light ray L1 passing through the first in-coupling region 51 is incident on the second in-coupling region 61 of the second surface 40b of the light guide 4A. The second in-coupling region 61 allows the second light ray L21 of the image light ray L1 to travel toward the second dividing region 62. In the second dividing region 62, the second extension region 621 divides the second light ray L21 from the second in-coupling region 61 into the plurality of second light rays L22 at the plurality of second dividing points Q11 to Q14 and allows the plurality of second light rays L22 to travel toward the second exit region 622. The second exit region 622 divides the plurality of second light rays L22 at the plurality of second dividing points Q21 to Q24, Q31 to Q34, Q41 to Q44 to allow the plurality of second exit light rays L23 to emerge toward the field of view region 8.

In the light guide 4A, similarly to the light guide 4, the first exit light rays L13 from the first dividing points P21 to P24, P31 to P34, P41 to P44 of the first exit region 522 arrive at the plurality of points R21 to R24, R31 to R34, R41 to R44 of the field of view region 8, respectively. The second exit light rays L23 from the second dividing points Q21 to Q24, Q31 to Q34, Q41 to Q44 of the second exit region 622 arrive at the plurality of points R21 to R24, R31 to R34, R41 to R44 of the field of view region 8, respectively. Accordingly, at the plurality of points R21 to R24, R31 to R34, R41 to R44 of the field of view region 8, virtual images constituted by the first exit light rays L13 and the second exit light rays L23 are formed.

1.2.2 Advantageous Effects

In the aforementioned optical system 3A, the light guide 4A is constituted by a single substrate. This configuration enables downsizing the light guide 4A.

The aforementioned image display device 1A includes the optical system 3A and the display element 2. This configuration enables improvement of color uniformity.

2. VARIATIONS

Embodiments of the present disclosure are not limited to the above embodiments. The above embodiments may be modified in various ways in accordance with designs or the like to an extent that they can achieve the problem of the present disclosure. Hereinafter, some variations or modifications of the above embodiments will be listed. One or more of the variations or modifications described below may apply in combination with one or more of the others.

In one variation, regarding the light guide 4, 4A, the first extension region 521 and the second extension region 621 may satisfy the above formulae (2) but the first exit region 522 and the second exit region 622 may not satisfy the above formulae (3). Instead of the first extension region 521 including the first point and the second point while the second extension region 621 including the third point and the fourth point, the first exit region 522 may include the first point and the second point while the second exit region 622 may include the third point and the fourth point. This is equivalent to a situation where the first extension region 521 and the second extension region 621 do not satisfy the above formula (2) but the first exit region 522 and the second exit region 622 satisfy the above formula (3).

In one variation, the number of first dividing points P and the number of second dividing points Q are not limited particularly. In embodiment 1, each of a group of the first dividing points P and a group of the second dividing points Q are arranged in a 4 by 4 matrix manner, but this is just one example.

In one variation, the first dividing region 52 may not include the first exit region 522. In this case, the first dividing region 52 expands the pupil of the image light ray L1 in one direction only. This may similarly apply to the second dividing region 62.

In one variation, the light amount of the second light ray L21 may be larger than the light amount of the first light ray L11. The second light ray L21 is absorbed in the light guide 4 more easily than the first light ray L11 is. Therefore, the light amount of the second light ray L21 is set to be larger than the light amount of the first light ray L11 in advance. This can reduce influence caused by internal absorption of the light guide 4. This configuration enables further improvement of the color uniformity.

In one variation, the dividing efficiency E2 may be equal to or lower than the dividing efficiency E1 and the dividing efficiency E4 may be equal to or lower than the dividing efficiency E3 as long as the above formula (2) is satisfied. Similarly, the dividing efficiency E6 may be equal to or lower than the dividing efficiency E5 and the dividing efficiency E8 may be equal to or lower than the dividing efficiency E7 as long as the above formula (3) is satisfied.

In one variation, the first dividing point P11 (first point) and the second dividing point Q11 (third point) may not necessarily correspond to a same point R21, R31, or R41 within the first peripheral region 81 and may correspond to different points as long as the different points are within the first peripheral region 81. The first dividing points P21 to P24 (fifth point) and the second dividing points Q21 to Q24 (seventh point) may not necessarily correspond to respective same points R21 to R24 within the third peripheral region 83 and may correspond to different points as long as the different points are within the third peripheral region 83. The first dividing points P41 to P44 (sixth point) and the second dividing point Q41 to Q44 (eighth point) may not necessarily correspond to respective same points R41 to R44 within the fourth peripheral region 84 and may correspond to different points as long as the different points are within the fourth peripheral region 84.

In one variation, the first peripheral region 81 may occupy less than a quarter of the field of view region 8 from the first end 8a of the field of view region 8 in the first predetermined direction A1. For example, the first peripheral region 81 may occupy one-eighth of the field of view region 8 from the first end 8a of the field of view region 8 in the first predetermined direction A1 or may be identical to the first end 8a of the field of view region 8. Narrowing the first peripheral region 81 enables further improvement of the color uniformity. This may similarly apply to the second peripheral region 82, the third peripheral region 83, and the fourth peripheral region 84.

In one variation, all of the length in the first direction D1 of the first extension region 521, the length in the second direction D2 of the first exit region 522, the length in the third direction D3 of the second extension region 621, or the length in the fourth direction D4 of the second exit region 622 may not necessarily be equal to or longer than 100 mm, but at least one of these may be equal to or longer than 100 mm.

In one variation, the first dividing region 52 may include as the structure defining the plurality of first dividing points P, a volume holographic optical element (holographic diffraction grating) or a half mirror, instead of a diffraction grating. Or, the first dividing region 52 may include as the structure defining the plurality of first dividing points P, at least one selected from a group consisting of a diffraction grating, a volume holographic optical element, or a half mirror. Similarly, the second dividing region 62 may include as the structure defining the plurality of second dividing points Q, at least one of a diffraction grating, a volume holographic optical element, or a half mirror.

In one variation, the first wavelength range is not limited to be between 510 nm and 780 nm inclusive. The second wavelength range is not limited to be between 380 nm and 480 nm inclusive. The refractive index for d-line of the light guide 4 may be equal to or lower than 1.7. The internal absorptance for the second light ray L21 of the light guide 4 is not limited to a range between 0.05%/mm and 0.50%/mm exclusive, but may be higher than the internal absorptance for the first light ray L11.

In one variation, the light guide 4, 4A may include a plurality of pairs of an in-coupling region and a dividing region respectively corresponding to a plurality of light rays with different wavelength ranges (different colors) included in the image light ray L1. For example, the light guide 4 may include a pair of an in-coupling region and a dividing region for expansion of a pupil of a red light ray of the image light ray L1, a pair of an in-coupling region and a dividing region for expansion of a pupil of a green light ray of the image light ray L1, and a pair of an in-coupling region and a dividing region for expansion of a pupil of a blue light ray of the image light ray L1. This configuration enables further improvement of the color uniformity.

For example, a light guide may include a first to third substrates. The first substrate and the second substrate face each other with a first air layer in-between. The second substrate and the third substrate face each other with a second air layer in-between. The first substrate may include a pair of an in-coupling region and a dividing region for expansion of a pupil of a red light ray of the image light ray L1. The second substrate may include a pair of an in-coupling region and a dividing region for expansion of a pupil of a green light ray of the image light ray L1. The third substrate may include a pair of an in-coupling region and a dividing region for expansion of a pupil of a blue light ray of the image light ray L1. The first to third substrates may be arranged to allow the image light ray L1 to be incident on the in-coupling region of the first substrate, the in-coupling region of the second substrate, and the in-coupling region of the third substrate in this order.

For example, the light guide may include in a single substrate a first pair of an in-coupling region and a dividing region for expansion of a pupil of a red light ray of the image light ray L1, a second pair of an in-coupling region and a dividing region for expansion of a pupil of a green light ray of the image light ray L1, and a third pair of an in-coupling region and a dividing region for expansion of a pupil of a blue light ray of the image light ray L1. The first pair may be a diffraction grating constituted by a recessed or protruded structure provided to a first surface in a thickness direction of the substrate. The second pair may be a volume holographic optical element provided inside the substrate. The third pair may be a diffraction grating constituted by a recessed or protruded structure provided to a second surface in the thickness direction of the substrate. The substrate may be located to direct the first surface toward a projection optical system.

In one variation, an order in which the image light ray L1 is incident on the first in-coupling region 51 and the second in-coupling region 61 is not limited particularly. In the light guide 4 of embodiment 1, the first substrate 5 is located between the projection optical system 7 and the second substrate 6 in an optical path of the image light ray L1 from the projection optical system 7. Differently from this, the second substrate 6 may be located between the projection optical system 7 and the first substrate 5 in the optical path of the image light ray L1 from the projection optical system 7. In this case, it is possible to reduce loss of the second light ray L21 with the second wavelength range caused by the first substrate 5. This may similarly apply to a case where the light guide includes three or more in-coupling regions.

In one variation, the projection optical system 7 may be constituted by a plurality of optical elements. The plurality of optical elements may include a first optical element and a second optical element. The first optical element is a compound lens where a negative meniscus lens and biconvex lens are combined, for example. The second optical element is a compound lens where a positive meniscus lens and a negative meniscus lens are combined, for example. Note that, the optical system 3 may not include the projection optical system 7.

In embodiments 1, 2, the projection optical system 7 and the first in-coupling region 51 as well as the second in-coupling region 61 are arranged in a straight line. However, it is not always necessary that the projection optical system 7 and the first in-coupling region 51 as well as the second in-coupling region 61 are arranged in a straight line. In other words, the optical path of the image light ray L1 from the projection optical system 7 to the first in-coupling region 51 as well as the second in-coupling region 61 always need not be straight. For example, the image light ray L1 from the projection optical system 7 may be reflected by a reflective plate to be incident on the first in-coupling region 51 as well as the second in-coupling region 61. In this arrangement, the optical path of the image light ray L1 from the projection optical system 7 to the first in-coupling region 51 as well as the second in-coupling region 61 is not straight but an L-shape, for example.

3. ASPECTS

As apparent from the above embodiment and variations, the present disclosure includes the following aspects. Hereinafter, reference signs in parenthesis are attached for the purpose of clearly showing correspondence with the embodiments only.

A first aspect is an optical system (3; 3A) including: a light guide (4; 4A) for guiding an image light ray (L1) which is output from a display element (2) and forms an image, to a field of view region (8) of a user as a virtual image. The image light ray (L1) includes a first light ray (L11) with a first wavelength range and a second light ray (L21) with a second wavelength range having wavelengths shorter than wavelengths in the first wavelength range. The light guide (4; 4A) includes a first in-coupling region (51), a first dividing region (52), a second in-coupling region (61), and a second dividing region (62). The first in-coupling region (51) allows the first light ray (L11) to enter the light guide (4; 4A) so that the first light ray (L11) propagates within the light guide (4; 4A). The first dividing region (52) includes a plurality of first dividing points (P) which divide the first light ray (L11) entering the light guide (4; 4A) from the first in-coupling region (51) and allows a plurality of first exit light rays (L13) to emerge toward the field of view region (8). The second in-coupling region (61) allows the second light ray (L21) to enter the light guide (4; 4A) so that the second light ray (L21) propagates within the light guide (4; 4A). The second dividing region (62) includes a plurality of second dividing points (Q) which divide the second light ray (L21) entering the light guide (4; 4A) from the second in-coupling region (61) and allows a plurality of second exit light rays (L23) to emerge toward the field of view region (8). The field of view region (8) includes a first peripheral region (81) on a side of a first end (8a) in a predetermined direction (A1) within a plane of the field of view region (8) and a second peripheral region (82) on a side of a second end (8b) in the predetermined direction (A1). The plurality of first dividing points (P) include a first point (P11) and a second point (P14) which are arranged in a first propagation direction (D1) corresponding to the predetermined direction (A1) to divide the first light ray (L11) propagating in the first propagation direction (D1). The first point (P11) corresponds to a point (R21, R31, R41) within the first peripheral region (81). The second point (P14) is further from the first in-coupling region (51) than the first point (P11) is, and corresponds to a point (R24, R34, R44) within the second peripheral region (82). The plurality of second dividing points (Q) include a third point (Q11) and a fourth point (Q14) which are arranged in a second propagation direction (D3) corresponding to the predetermined direction (A1) to divide the second light ray (L21) propagating in the second propagation direction (D3). The third point (Q11) corresponds to a point (R21, R31, R41) within the first peripheral region (81). The fourth point (Q14) is further from the second in-coupling region (61) than the third point (Q11) is, and corresponds to a point (R24, R34, R44) within the second peripheral region (82). When a dividing efficiency for the first light ray (L11) at the first point (P11) is denoted by E1, a dividing efficiency for the first light ray (L11) at the second point (P14) is denoted by E2, a dividing efficiency for the second light ray (L21) at the third point (Q11) is denoted by E3, and a dividing efficiency for the second light ray (L21) at the fourth point (Q14) is denoted by E4, the dividing efficiencies E1, E2, E3, and E4 satisfy the following formula (6).

[FORMULA 6]

$$\left(\frac{E2}{E1}\right) \div \left(\frac{E4}{E3}\right) \times \left(\frac{E3}{E1}\right)^2 < 0.9 \tag{6}$$

This aspect enables improvement of color uniformity.

A second aspect is the optical system (3; 3A) based on the first aspect. In the second aspect, a light amount of the second light ray (L21) is larger than a light amount of the first light ray (L11). This aspect enables further improvement of color uniformity.

A third aspect is the optical system (3; 3A) based on the first or second aspect. In the third aspect, the dividing efficiency E2 is larger than the dividing efficiency E1. The dividing efficiency E4 is larger than the dividing efficiency E3. This configuration enables improvement of luminance uniformity regarding the predetermined direction of the field of view region.

A fourth aspect is the optical system (3; 3A) based on any one of the first to third aspects. In the fourth aspect, the first point (P11) and the third point (Q11) correspond to a same point (R21, R31, R41) within the first peripheral region (81). The second point (P14) and the fourth point (Q14) correspond to a same point (R24, R34, R44) within the second peripheral region (82). This aspect enables further improvement of color uniformity.

A fifth aspect is the optical system (3; 3A) based on any one of the first to fourth aspects. In the fifth aspect, the first peripheral region (81) occupies a quarter of the field of view region (8) from the first end (8a) of the field of view region (8) in the predetermined direction (A1). The second peripheral region (82) occupies a quarter of the field of view region (8) from the second end (8b) of the field of view region (8) in the predetermined direction (A1). This aspect enables further improvement of color uniformity.

A sixth aspect is the optical system (3; 3A) based on any one of the first to fifth aspects. In the sixth aspect, the first dividing region (52) includes a first extension region (521) and a first exit region (522). The first extension region (521) divides the first light ray (L11) propagating within the light guide (4; 4A) into a plurality of first light rays (L12) arranged in a first direction (D1) perpendicular to a thickness direction of the light guide (4; 4A) and allows the plurality of first light rays (L12) arranged in the first direction (D1) to travel toward the first exit region (522). The first exit region (522) divides the plurality of first light rays (L12) from the first extension region (521) into a plurality of first light rays (L13) arranged in a second direction (D2) perpendicular to the thickness direction of the light guide (4; 4A) and intersecting the first direction (D1) and allows the plurality of first light rays (L13) arranged in the second direction (D2) to emerge toward the field of view region (8) as the plurality of first exit light rays (L13). The second dividing region (62) includes a second extension region (621) and a second exit region (622). The second extension region (621) divides the second light ray (L21) propagating within the light guide (4; 4A) into a plurality of second light rays (L22) arranged in a third direction (D3) corresponding to the first direction (D1) and allows the plurality of second light rays (L22) arranged in the third direction (D3) to travel toward the second exit region (622). The second exit region (622) divides the plurality of second light rays (L22) from the second extension region (621) into a plurality of second light rays (L23) arranged in a fourth direction (D4) corresponding to the second direction (D2) and allows the plurality of second light rays (L23) arranged in the fourth direction (D4) to emerge toward the field of view region (8) as the plurality of second exit light rays (L23). The first extension region (521) includes the first point and the second point while the second extension region (621) includes the third point and the fourth point, or the first exit region (522) includes the first point and the second point while the second exit region (622) includes the third point and the fourth point. This aspect enables expansion of the pupil of the image light ray (L13) in two directions.

A seventh aspect is the optical system (3; 3A) based on the sixth aspect. In the seventh aspect, at least one of a length in the first direction (D1) of the first extension region (521), a length in the second direction (D2) of the first exit region (522), a length in the third direction (D3) of the second extension region (621), or a length in the fourth direction (D4) of the second exit region (622) is equal to or longer than 100 mm. This aspect enables provision of the field of view region (8) with a sufficient size to the user.

An eighth aspect is the optical system (3; 3A) based on the sixth or seventh aspect. In the eighth aspect, the field of view region (8) includes a third peripheral region (83) on a side of a third end (8c) in a second predetermined direction (A2) different from a first predetermined direction (A1) being the predetermined direction (A1) within the plane of the field of view region (8) and a fourth peripheral region (84) on a side of a fourth end (8d) in the second predetermined direction (A2). The plurality of first dividing points (P) include a fifth point (P21 to P24) and a sixth point (P41 to P44) which are arranged in a third propagation direction (D2) corresponding to the second predetermined direction (A2) to divide a first light ray (L12) propagating in the third propagation direction (D2). The fifth point (P21 to P24) corresponds to a point (R21, R22, R23, R24) within the third peripheral region (83). The sixth point (P41 to P44) is further from the first in-coupling region (51) than the fifth point (P21 to P24) is, and corresponds to a point (R41, R42, R43, R44) within the fourth peripheral region (84). The plurality of second dividing points (Q) include a seventh point (Q21 to Q24) and an eighth point (Q41 to Q44) which are arranged in a fourth propagation direction (D4) corresponding to the second predetermined direction (A2) to divide a second light ray (L22) propagating in the fourth propagation direction (D4). The seventh point (Q21 to Q24) corresponds to a point (R21, R22, R23, R24) within the third peripheral region (83). The eighth point (Q41 to Q44) is further from the second in-coupling region (61) than the seventh point (Q21 to Q24) is, and corresponds to a point (R41, R42, R43, R44) within the fourth peripheral region (84). When a dividing efficiency for the first light ray (L12) at the fifth point (P21 to P24) is denoted by E5, a dividing efficiency for the first light ray (L12) at the sixth point (P41 to P44) is denoted by E6, a dividing efficiency for the second light ray (L22) at the seventh point (Q21 to Q24) is denoted by E7, and a dividing efficiency for the second light ray (L22) at the eighth point (Q41 to Q44) is denoted by E8, the dividing efficiencies E5, E6, E7, and E8 satisfy the following formula (7).

[FORMULA 7]

$$\left(\frac{E6}{E5}\right) \div \left(\frac{E8}{E7}\right) \times \left(\frac{E7}{E5}\right)^2 < 0.9 \tag{7}$$

The first extension region (521) includes the first point (P11) and the second point (P14) while the second expansion region (621) includes the third point (Q11) and the fourth point (Q14). The first exit region (522) includes the fifth point (P21 to P24) and the sixth point (P41 to P44) while the second exit region (622) includes the seventh point (Q21 to Q24) and the eighth point (Q41 to Q44). This aspect enables improvement of color uniformity.

A ninth aspect is the optical system (3; 3A) based on the eighth aspect. In the ninth aspect, the dividing efficiency E6 is larger than the dividing efficiency E5. The dividing efficiency E8 is larger than the dividing efficiency E7. This aspect enables improvement of luminance uniformity regarding the second predetermined direction of the field of view region.

A tenth aspect is the optical system (3; 3A) based on the eighth or ninth aspect. In the tenth aspect, the fifth point (P21 to P24) and the seventh point (Q21 to Q24) correspond to a same point (R21 to R24) within the third peripheral region (83). The sixth point (P41 to P44) and the eighth point (Q41 to Q44) correspond to a same point (R41 to R44) within the fourth peripheral region. This aspect enables improvement of color uniformity.

An eleventh aspect is the optical system (3; 3A) based on any one of the eighth to tenth aspects. In the eleventh aspect, the third peripheral region (83) occupies a quarter of the field of view region (8) from the third end (8c) of the field of view region (8) in the second predetermined direction (A2). The fourth peripheral region (84) occupies a quarter of the field of view region (8) from the fourth end (8d) of the field of view region (8) in the second predetermined direction (A2). This aspect enables improvement of color uniformity.

A twelfth aspect is the optical system (3) based on any one of the first to eleventh aspects. In the twelfth aspect, the light guide (4; 4A) includes first and second substrates (5, 6) facing each other with an air layer (41) in-between. The first in-coupling region (51) and the first dividing region (52) are provided to the first substrate (5). The second in-coupling region (61) and the second dividing region (62) are provided to the second substrate (6). This aspect enables improvement of color uniformity.

A thirteenth aspect is the optical system (3A) based on any one of the first to twelfth aspects. In the thirteenth aspect, the light guide (4A) is constituted by a single substrate. This aspect enables downsizing the light guide (4A).

A fourteenth aspect is the optical system (3; 3A) based on any one of the first to thirteenth aspects. In the fourteenth aspect, the first dividing region (52) includes, as a structure defining the plurality of first dividing points (P), at least one of a diffraction grating, a volume holographic optical element, or a half mirror. The second dividing region (62) includes, as a structure defining the plurality of second dividing points (Q), at least one of a diffraction grating, a volume holographic element, or a half mirror. This aspect enables improvement of color uniformity.

A fifteenth aspect is the optical system (3; 3A) based on any one of the first to fourteenth aspects. In the fifteenth aspect, the first wavelength range is between 510 nm and 780 nm inclusive. The second wavelength range is between 380 nm and 480 nm inclusive. This aspect enables improvement of color uniformity.

A sixteenth aspect is the optical system (3; 3A) based on any one of the first to fifteenth aspects. In the sixteenth aspect, a refractive index for d-line of the light guide (4; 4A) is larger than 1.7. This aspect enables reducing an area of the field of view region (8) where no pupil of the image light ray (L1) is located.

A seventeenth aspect is the optical system (3; 3A) based on any one of the first to sixteenth aspects. In the seventeenth aspect, an internal absorptance for the second light ray (L21) of the light guide (4; 4A) is larger than 0.05%/mm and is smaller than 0.50%/mm. This aspect enables improvement of color uniformity.

An eighteenth aspect is the optical system (3; 3A) based on any one of the first to seventeenth aspects. In the eighteenth aspect, the optical system (3; 3A) further includes a projection optical system (7) allowing the image light ray (L1) to be incident on the first in-coupling region (51) and the second in-coupling region (61) of the light guide (4; 4A) as a substantial collimate light ray. This aspect enables improvement of color uniformity.

A nineteenth aspect is the optical system (3; 3A) based on any one of the first to eighteenth aspects. In the nineteenth aspect, the plurality of first exit light rays (L13) are parallel to each other. The plurality of second exit light rays (L23) are parallel to each other. This aspect enables reducing an area of the field of view region (8) where no pupil of the image light ray (L1) is located.

A twentieth aspect is an image display device (1; 1A) including: the optical system (3; 3A) based on any one of the first to nineteenth aspects; and the display element (2). This aspect enables improvement of color uniformity.

The aforementioned second to nineteenth aspects are optional.

As above, as examples of techniques in the present disclosure, the embodiments are described. For this purpose, the attached drawings and the description are provided. Therefore, components described in the attached drawings and the description may include not only components necessary for solving problems but also components which are unnecessary for solving problems but useful for exemplifying the above techniques. Note that, such unnecessary components should not be considered as necessary just for the reason why such unnecessary components are described in the attached drawings and the description. Further, the embodiment described above is just prepared for exemplifying the techniques in the present disclosure and thus may be subjected to various modification, replacement, addition, omission, or the like within the scope defined by claims and those equivalent range.

INDUSTRIAL APPLICABILITY

The present disclosure applies to optical systems and image display devices. Concretely, the present disclosure can apply to an optical system for guiding an image light ray from a display element to a field of view region of a user as a virtual image, and an image display device including this optical system.

EXPLANATION OF REFERENCES 1, 1A Image Display Device
2 Display Element
3, 3A Optical System
4, 4A Light Guide
41 Air Layer
5 First Substrate
51 First In-coupling Region
52 First Dividing Region
521 First Extension Region
522 First Exit Region
6 Second Substrate
61 Second In-coupling Region
62 Second Dividing Region
621 Second Extension Region
622 Second Exit Region
7 Projection Optical System
8 Field of View Region
8a First End
8b Second End
8c Third End
8d Fourth End
81 First Peripheral Region
82 Second Peripheral Region
83 Third Peripheral Region
84 Fourth Peripheral Region
L1 Image Light Ray L11, L12 First Light Ray
L13 First Exit Light Ray (First Light Ray)
L21, L22 Second Light Ray
L23 Second Exit Light Ray (Second Light Ray)
P11-P14, P21-P24, P31-P34, P41-P44 First Dividing Point
Q11-Q14, Q21-Q24, Q31-Q34, Q41-Q44 Second Dividing Point
R21-R24, R31-R34, R41-R44 Point
D1 First Direction (First Propagation Direction)
D2 Second direction (Third Propagation Direction)
D3 Third Direction (Second Propagation Direction)
D4 Fourth Direction (Fourth Propagation Direction)
The invention claimed is:

1. An optical system comprising:
a light guide for guiding an image light ray which is output from a display element and forms an image, to a field of view region of a user as a virtual image,
the image light ray including a first light ray with a first wavelength range and a second light ray with a second wavelength range having wavelengths shorter than wavelengths in the first wavelength range,
the light guide including
    a first in-coupling region allowing the first light ray to enter the light guide so that the first light ray propagates within the light guide,
    a first dividing region including a plurality of first dividing points which divide the first light ray entering the light guide from the first in-coupling region and allowing a plurality of first exit light rays to emerge toward the field of view region,
    a second in-coupling region allowing the second light ray to enter the light guide so that the second light ray propagates within the light guide, and
    a second dividing region including a plurality of second dividing points which divide the second light ray entering the light guide from the second in-coupling region and allowing a plurality of second exit light rays to emerge toward the field of view region,
the field of view region including a first peripheral region on a side of a first end in a predetermined direction within a plane of the field of view region and a second peripheral region on a side of a second end in the predetermined direction,
the plurality of first dividing points including a first point and a second point which are arranged in a first propagation direction corresponding to the predetermined direction to divide the first light ray propagating in the first propagation direction,
the first point corresponding to a point within the first peripheral region,
the second point being further from the first in-coupling region than the first point is, and corresponding to a point within the second peripheral region,
the plurality of second dividing points including a third point and a fourth point which are arranged in a second propagation direction corresponding to the predetermined direction to divide the second light ray propagating in the second propagation direction,
the third point corresponding to a point within the first peripheral region,
the fourth point being further from the second in-coupling region than the third point is, and corresponding to a point within the second peripheral region, and
when a dividing efficiency for the first light ray at the first point is denoted by E1, a dividing efficiency for the first light ray at the second point is denoted by E2, a dividing efficiency for the second light ray at the third point is denoted by E3, and a dividing efficiency for the second light ray at the fourth point is denoted by E4, the dividing efficiencies E1, E2, E3, and E4 satisfying $$\left(\frac{E2}{E1}\right) \div \left(\frac{E4}{E3}\right) \times \left(\frac{E3}{E1}\right)^2 < 0.9. \qquad \text{[FORMULA 1]}$$

2. The optical system according to claim 1, wherein in the image light ray, a light amount of the second light ray is larger than a light amount of the first light ray.

3. The optical system according to claim 1, wherein:
the dividing efficiency E2 is larger than the dividing efficiency E1; and
the dividing efficiency E4 is larger than the dividing efficiency E3.

4. The optical system according to any one of claim 1, wherein:
the first point and the third point correspond to a same point within the first peripheral region; and
the second point and the fourth point correspond to a same point within the second peripheral region.

5. The optical system according to any one of claim 1, wherein:
the first peripheral region occupies a quarter of the field of view region from the first end of the field of view region in the predetermined direction; and
the second peripheral region occupies a quarter of the field of view region from the second end of the field of view region in the predetermined direction.

6. The optical system according to any one of claim 1, wherein:
the first dividing region includes a first extension region and a first exit region;
the first extension region divides the first light ray propagating within the light guide into a plurality of first light rays arranged in a first direction perpendicular to a thickness direction of the light guide and allows the plurality of first light rays arranged in the first direction to travel toward the first exit region;
the first exit region divides the plurality of first light rays from the first extension region into a plurality of first light rays arranged in a second direction perpendicular to the thickness direction of the light guide and intersecting the first direction and allows the plurality of first light rays arranged in the second direction to emerge toward the field of view region as the plurality of first exit light rays;
the second dividing region includes a second extension region and a second exit region;
the second extension region divides the second light ray propagating within the light guide into a plurality of second light rays arranged in a third direction corresponding to the first direction and allows the plurality of second light rays arranged in the third direction to travel toward the second exit region;
the second exit region divides the plurality of second light rays from the second extension region into a plurality of second light rays arranged in a fourth direction corresponding to the second direction and allows the plurality of second light rays arranged in the fourth direction to emerge toward the field of view region as the plurality of second exit light rays; and
the first extension region includes the first point and the second point while the second extension region includes the third point and the fourth point, or the first exit region includes the first point and the second point while the second exit region includes the third point and the fourth point.

7. The optical system according to claim 6, wherein at least one of a length in the first direction of the first extension region, a length in the second direction of the first exit region, a length in the third direction of the second extension region, or a length in the fourth direction of the second exit region is equal to or longer than 100 mm.

8. The optical system according to claim 6, wherein:

the field of view region includes a third peripheral region on a side of a third end in a second predetermined direction intersecting a first predetermined direction being the predetermined direction within the plane of the field of view region and a fourth peripheral region on a side of a fourth end in the second predetermined direction;

the plurality of first dividing points include a fifth point and a sixth point which are arranged in a third propagation direction corresponding to the second predetermined direction to divide a first light ray propagating in the third propagation direction;

the fifth point corresponds to a point within the third peripheral region;

the sixth point is further from the first in-coupling region than the fifth point is, and corresponds to a point within the fourth peripheral region;

the plurality of second dividing points include a seventh point and an eighth point which are arranged in a fourth propagation direction corresponding to the second predetermined direction to divide a second light ray propagating in the fourth propagation direction;

the seventh point corresponds to a point within the third peripheral region;

the eighth point is further from the second in-coupling region than the seventh point is, and corresponds to a point within the fourth peripheral region;

when a dividing efficiency for the first light ray at the fifth point is denoted by E5, a dividing efficiency for the first light ray at the sixth point is denoted by E6, a dividing efficiency for the second light ray at the seventh point is denoted by E7, and a dividing efficiency for the second light ray at the eighth point is denoted by E8, the dividing efficiencies E5, E6, E7, and E8 satisfy $$\left(\frac{E6}{E5}\right) \div \left(\frac{E8}{E7}\right) \times \left(\frac{E7}{E5}\right)^2 < 0.9; \qquad \text{[FORMULA 2]}$$

and the first extension region includes the first point and the second point while the second expansion region includes the third point and the fourth point; and the first exit region includes the fifth point and the sixth point while the second exit region includes the seventh point and the eighth point.

9. The optical system according to claim 8, wherein:

the dividing efficiency E6 is larger than the dividing efficiency E5; and the dividing efficiency E8 is larger than the dividing efficiency E7.

10. The optical system according to claim 8, wherein:

the fifth point and the seventh point correspond to a same point within the third peripheral region; and the sixth point and the eighth point correspond to a same point within the fourth peripheral region.

11. The optical system according to any one of claim 8, wherein:

the third peripheral region occupies a quarter of the field of view region from the third end of the field of view region in the second predetermined direction; and the fourth peripheral region occupies a quarter of the field of view region from the fourth end of the field of view region in the second predetermined direction.

12. The optical system according to any one of claim 1, wherein:

the light guide includes first and second substrates facing each other with an air layer in-between;

the first in-coupling region and the first dividing region are provided to the first substrate; and the second in-coupling region and the second dividing region are provided to the second substrate.

13. The optical system according to any one of claim 1, wherein:

the light guide is constituted by a single substrate.

14. The optical system according to any one of claim 1, wherein:

the first dividing region includes, as a structure defining the plurality of first dividing points, at least one of a diffraction grating, a volume holographic optical element, or a half mirror; and the second dividing region includes, as a structure defining the plurality of second dividing points, at least one of a diffraction grating, a volume holographic optical element, or a half mirror.

15. The optical system according to any one of claim 1, wherein:

the first wavelength range is between 510 nm and 780 nm inclusive; and the second wavelength range is between 380 nm and 480 nm inclusive.

16. The optical system according to any one of claim 1, wherein a refractive index for d-line of the light guide is larger than 1.7.

17. The optical system according to any one of claim 1, wherein:

an internal absorptance for the second light ray of the light guide is larger than 0.05%/mm and is smaller than 0.50%/mm.

18. The optical system according to any one of claim 1, further comprising a projection optical system allowing the image light ray to be incident on the first in-coupling region and the second in-coupling region of the light guide as a substantial collimate light ray.

19. The optical system according to any one of claim 1, wherein:

the plurality of first exit light rays are parallel to each other; and the plurality of second exit light rays are parallel to each other.

20. An image display device comprising:

the optical system according to any one of claim 1; and the display element.

* * * * *